US012135153B2

(12) United States Patent
Jiang et al.

(10) Patent No.: US 12,135,153 B2
(45) Date of Patent: Nov. 5, 2024

(54) LIQUID STORAGE CONTAINER AND MANUFACTURING METHOD THEREOF

(71) Applicant: Zhejiang Sanhua Automotive Components Co., Ltd., Zhejiang (CN)

(72) Inventors: Zongbao Jiang, Zhejiang (CN); Shulin Zhou, Zhejiang (CN); Jinchao Yuan, Zhejiang (CN)

(73) Assignee: Zhejiang Sanhua Automotive Components Co., Ltd., Hangzhou (CN)

( * ) Notice: Subject to any disclaimer, the term of this patent is extended or adjusted under 35 U.S.C. 154(b) by 1185 days.

(21) Appl. No.: 16/771,179

(22) PCT Filed: Dec. 17, 2018

(86) PCT No.: PCT/CN2018/121544
§ 371 (c)(1),
(2) Date: Jun. 9, 2020

(87) PCT Pub. No.: WO2019/128761
PCT Pub. Date: Jul. 4, 2019

(65) Prior Publication Data
US 2021/0172660 A1    Jun. 10, 2021

(30) Foreign Application Priority Data

Dec. 25, 2017    (CN) .......................... 201711421540.7
Dec. 25, 2017    (CN) .......................... 201721837705.4

(51) Int. Cl.
*F25B 43/00* (2006.01)
*B21D 17/04* (2006.01)
(Continued)

(52) U.S. Cl.
CPC ............ *F25B 43/003* (2013.01); *B21D 17/04* (2013.01); *B21D 22/02* (2013.01); *B23K 31/02* (2013.01);
(Continued)

(58) Field of Classification Search
CPC ........ B21D 17/04; B21D 22/02; B21D 39/06; B21D 53/02; F25B 43/00; F25B 2400/16;
(Continued)

(56) References Cited

U.S. PATENT DOCUMENTS 4,364,756 A    12/1982    Clarke et al.
5,289,697 A    3/1994    Hutchison
(Continued)

FOREIGN PATENT DOCUMENTS

CN    2804737 Y    8/2006
CN    201233141 Y    5/2009
(Continued)

OTHER PUBLICATIONS

EP18896062.9, Aug. 11, 2021, Extended European Search Report.
(Continued)

*Primary Examiner* — Thuan D Dang
(74) *Attorney, Agent, or Firm* — Wolf, Greenfield & Sacks, P.C.

(57) ABSTRACT

A liquid reservoir includes a housing and a cover hermetically fixed to the housing, and further includes a flow guiding pipe having one end connected with the housing, and a filter assembly arranged in the housing and including first and second position-limiting assemblies, a filter member, and a molecular sieve. The first position-limiting assembly includes at least a first position-limiting member having a bottom portion, first and second protrusions. A part of an outer side wall of the flow guiding pipe is limited by and in cooperation with an inner side wall of the first protrusion which is located on an outer peripheral side of the part of the outer side wall of the flow guiding pipe. An outer side wall of the second protrusion is located on an inner peripheral side of a part of an inner sidewall of the housing.

18 Claims, 15 Drawing Sheets

(51) Int. Cl.
    *B21D 22/02*     (2006.01)
    *B23K 31/02*     (2006.01)
    *B23P 13/02*     (2006.01)
    *B23P 15/00*     (2006.01)
    *B23P 19/02*     (2006.01)

(52) U.S. Cl.
    CPC ............ *B23P 13/02* (2013.01); *B23P 15/00* (2013.01); *B23P 19/02* (2013.01); *B23P 2700/50* (2013.01); *F25B 2400/16* (2013.01)

(58) Field of Classification Search
    CPC ........ F25B 43/003; B23K 31/02; B23P 13/02; B23P 15/00; B23P 19/02; B23P 2700/50
    See application file for complete search history.

(56) References Cited

U.S. PATENT DOCUMENTS

| | | | |
|---|---|---|---|
| 5,759,241 A * | 6/1998 | Klett | ............. B01D 53/261 220/373 |
| 6,170,288 B1 | 1/2001 | Incorvia | |
| 2012/0060546 A1 | 3/2012 | Armsden et al. | |

FOREIGN PATENT DOCUMENTS

| | | |
|---|---|---|
| CN | 102141329 A | 8/2011 |
| CN | 205027011 U | 2/2016 |
| CN | 206310808 U | 7/2017 |
| EP | 1 574 796 A2 | 9/2005 |
| JP | S53-165365 U | 12/1978 |
| JP | H07-190567 A | 7/1995 |
| JP | 2001-221542 A | 8/2001 |
| JP | 2010-144935 A | 7/2010 |
| KR | 10-2005-0088139 A | 9/2005 |
| KR | 10-2017-0108273 A | 9/2017 |
| WO | WO 98/04875 A1 | 2/1998 |

OTHER PUBLICATIONS

JP2020-534467, Jun. 24, 2021, Office Action.
KR10-2020-7019531, Jul. 23, 2021, Office Action.
Extended European Search Report for European Application No. 18896062.9, dated Aug. 11, 2021.
Office Action for Japanese Application No. 2020-534467, dated Jun. 24, 2021.
Office Action for Korean Application No. 10-2020-7019531, dated Jul. 23, 2021.
PCT/Cn2018/121544, Mar. 6, 2019, International Search Report and Written Opinion.
International Search Report and Written Opinion for International Application No. PCT/CN2018/121544, mailed Mar. 6, 2019.

* cited by examiner

LIQUID STORAGE CONTAINER AND MANUFACTURING METHOD THEREOF

This application is a national stage filing under 35 U.S.C. § 371 of International Patent Application Serial No. PCT/CN2018/121544, filed Dec. 17, 2018, which claims priority to Chinese Patent Application No. 201711421540.7, titled "LIQUID RESERVOIR AND MANUFACTURE METHOD THEREOF", filed with the China National Intellectual Property Administration on Dec. 25, 2017, and Chinese Patent Application No. 201721837705.4, titled "LIQUID RESERVOIR", filed with the China National Intellectual Property Administration on Dec. 25, 2017. The contents of these applications are incorporated herein by reference in their entireties.

FIELD

The present invention relates to the technical field of air conditioning, in particular to a liquid reservoir, and further relates to a method for manufacturing the same.

BACKGROUND

The liquid receiver is an important accessory in the vehicle air-conditioning system, and the functions thereof include storing refrigerant, filtering impurities, and absorbing moisture. With the continuous development of technology, vehicles are having higher and higher requirements for the cleanliness of refrigerants, and since the liquid reservoir can be used as a medium for drying and filtering, the requirements for the filtering capacity of the liquid reservoir are becoming higher and higher to ensure the cleanliness of the refrigerant.

SUMMARY

An object of the present application is to provide a liquid reservoir with a relatively stable filter assembly structure, which can relatively improve the filtering effect of the liquid reservoir.

To achieve the above object, the following technical solutions re provided in the present application.

A liquid reservoir includes a cover and a housing. The cover is hermetically fixed to the housing. The liquid reservoir further includes a flow guiding pipe, and one end of the flow guiding pipe is connected with the housing.

The liquid reservoir further includes a filter assembly, which is arranged in the housing. The filter assembly includes a first position-limiting assembly, a second position-limiting assembly, a filter member, and a molecular sieve. The first position-limiting assembly includes at least a first position-limiting member. The first position-limiting member includes a bottom portion, a first protrusion, and a second protrusion. The first protrusion protrudes from an inner peripheral edge of the bottom portion toward a side away from the filter member. A part of an outer side wall of the flow guiding pipe is limited by and in cooperation with an inner side wall of the first protrusion. The inner side wall of the first protrusion is located on an outer peripheral side of the part of the outer side wall of the flow guiding pipe. The second protrusion protrudes from an outer peripheral edge of the bottom portion toward a side away from the filter member. An outer side wall of the second protrusion is located on an inner peripheral side of a part of an inner sidewall of the housing.

A method for manufacturing the liquid reservoir includes:
providing a housing, and rolling an outer wall of the housing to form a position-limiting protrusion; providing a second position-limiting member and a flow guiding pipe, and assembling the flow guiding pipe with the second position-limiting member, to allow the second position-limiting member to be limited by and in cooperation with the position-limiting protrusion;
providing a filter member, and making one side of the filter member directly or indirectly abut against the second position-limiting member;
providing a first position-limiting member, assembling the flow guiding pipe with the first position-limiting member, and making another side of the filter member directly or indirectly abut against the first position-limiting member; and providing a cover, and fixing the cover to the housing by welding.

For the liquid reservoir manufactured according to the above method, an internal structure of the filter assembly is relatively stable, which can relatively improve the filtering effect of the liquid reservoir.

BRIEF DESCRIPTION OF THE DRAWINGS

In order to illustrate technical solutions in the embodiments of the present application or in the conventional technology more clearly, drawings used in the description of the embodiments or the conventional technology are introduced briefly hereinafter. Apparently, the drawings described hereinafter merely illustrate some embodiments of the present application, and other drawings may be obtained by those skilled in the art based on these drawings without any creative efforts.

DETAILED DESCRIPTION OF THE EMBODIMENTS

Figure 1:
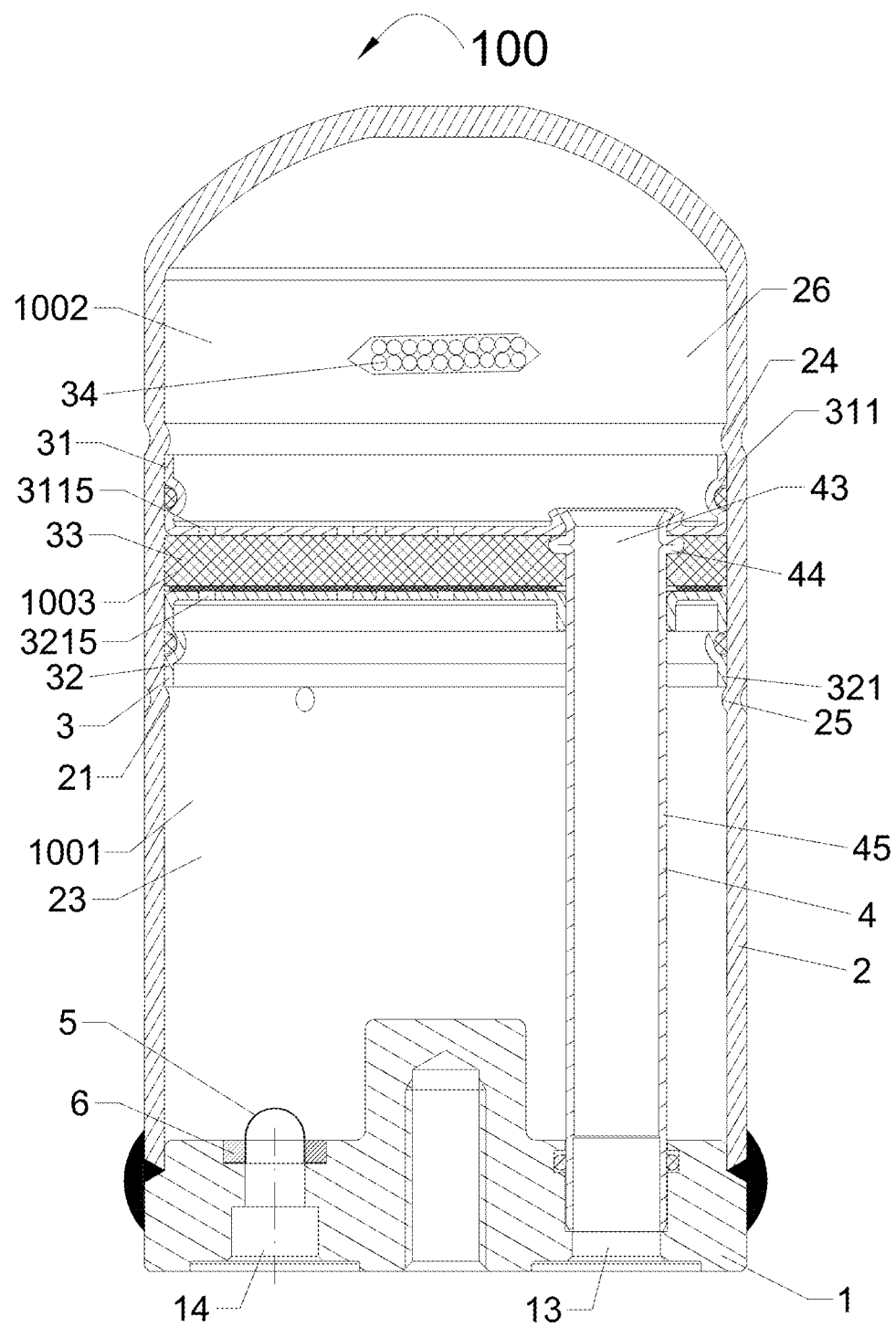
FIG. 1 is a schematic sectional view of an embodiment of a liquid reservoir according to the present application.
Figure 2:
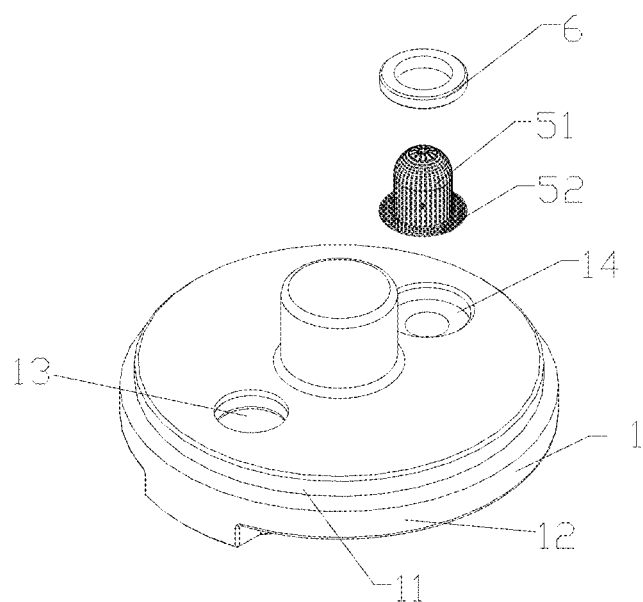
FIG. 2 is an perspective exploded view showing a cover, a sieve, and a gasket.
Figure 3:
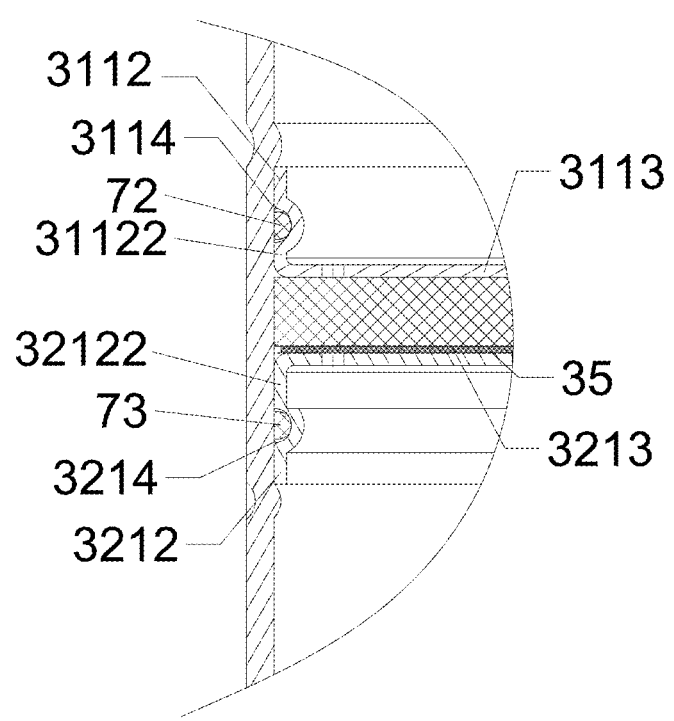
FIG. 3 is a partially enlarged view showing one side of the filter assembly and the housing shown in FIG. 1.
Figure 4:
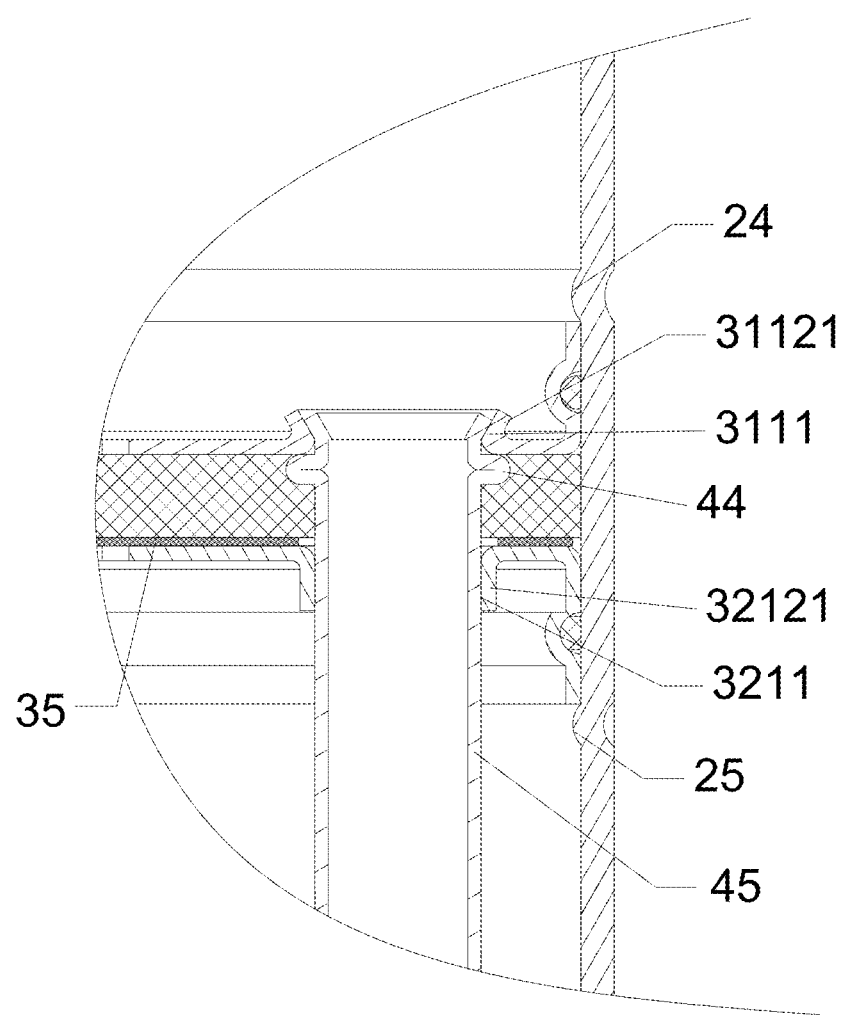
FIG. 4 is a partially enlarged view showing another side of the filter assembly and the housing shown in FIG. 1.
Figure 5:
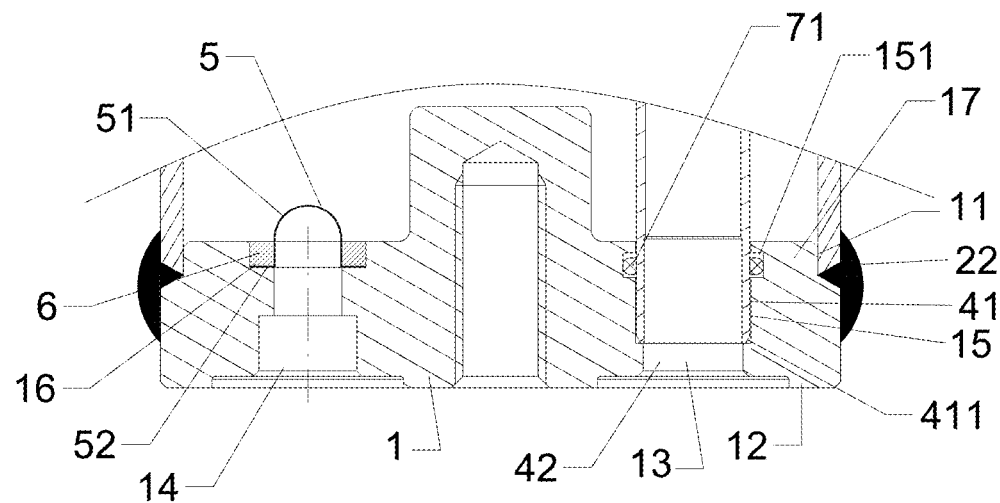
FIG. 5 is a partially enlarged view showing an assembly of the cover, a flow guiding pipe, the sieve, and the gasket shown in FIG. 1.
Figure 6:
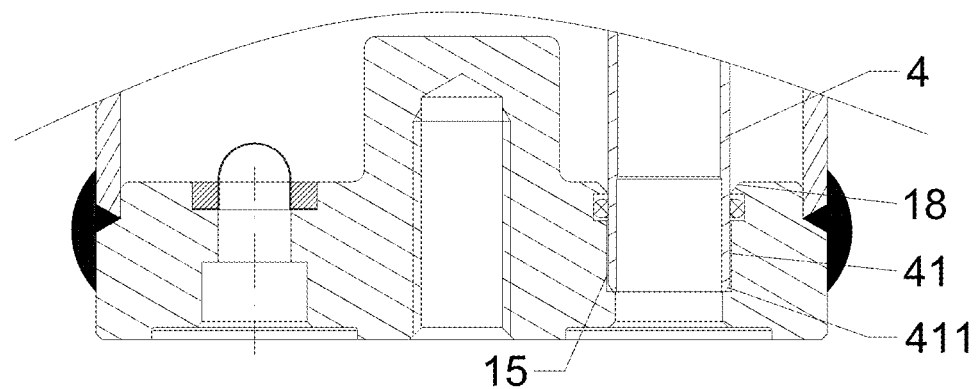
FIG. 6 is a partially enlarged view showing an assembly of a cover, a flow guiding pipe, a sieve, and a gasket in a second embodiment.
Figure 7:
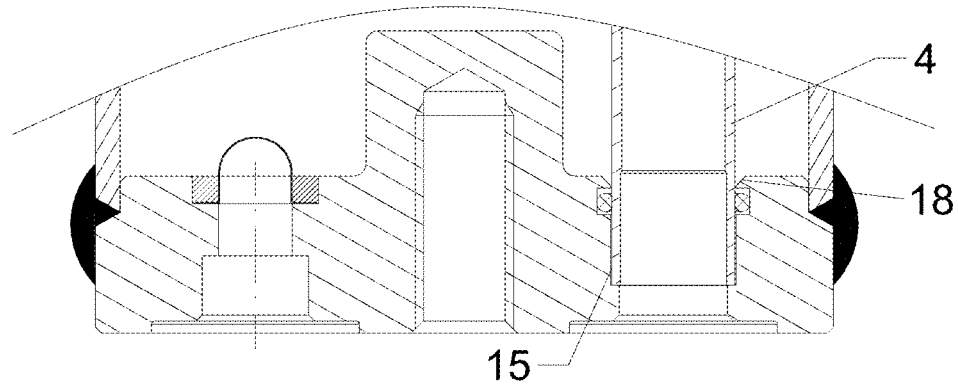
FIG. 7 is a partially enlarged view showing an assembly of a cover, a flow guiding pipe, a sieve, and a gasket in a third embodiment.
Figure 8:
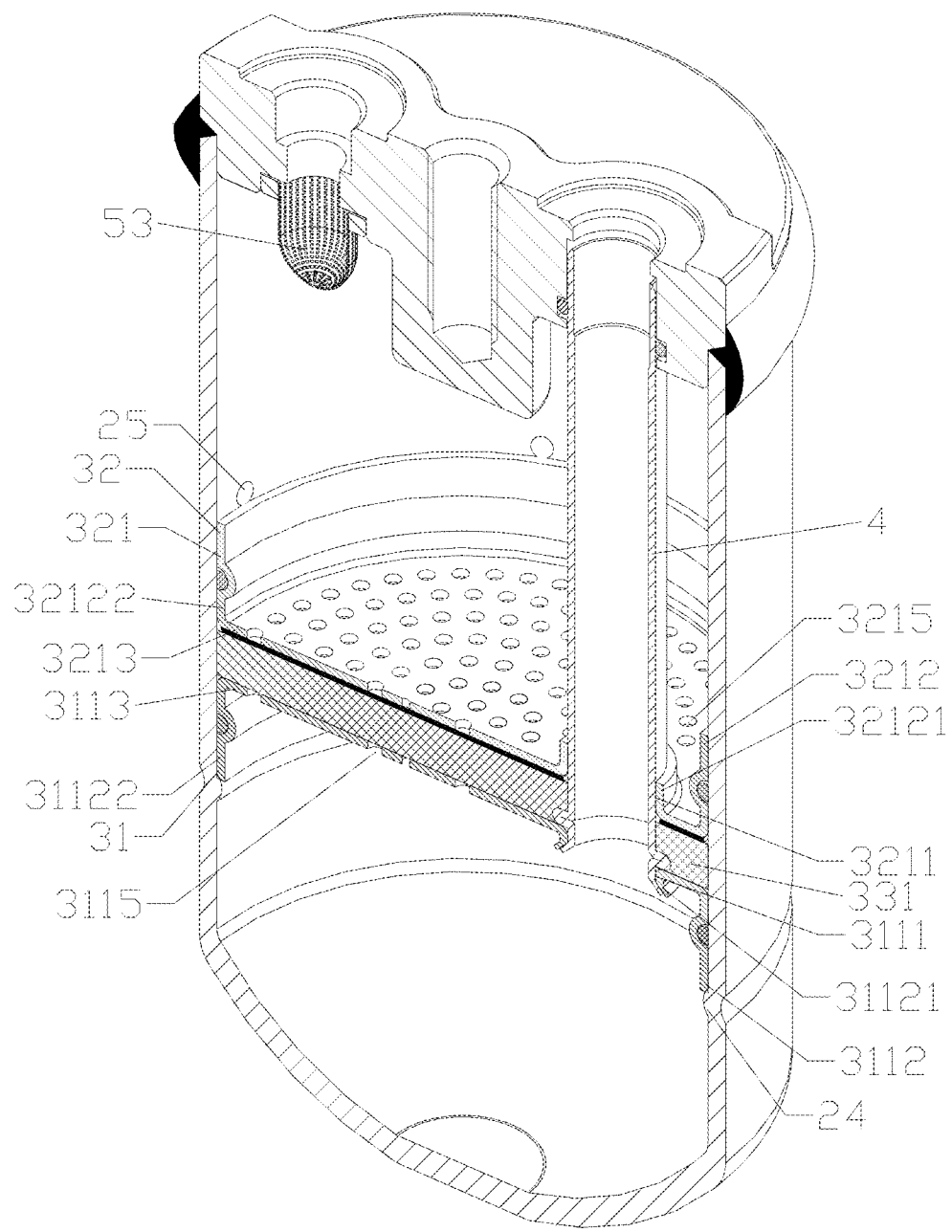
FIG. 8 is a perspective sectional view of the liquid reservoir shown in FIG. 1.
Figure 9:
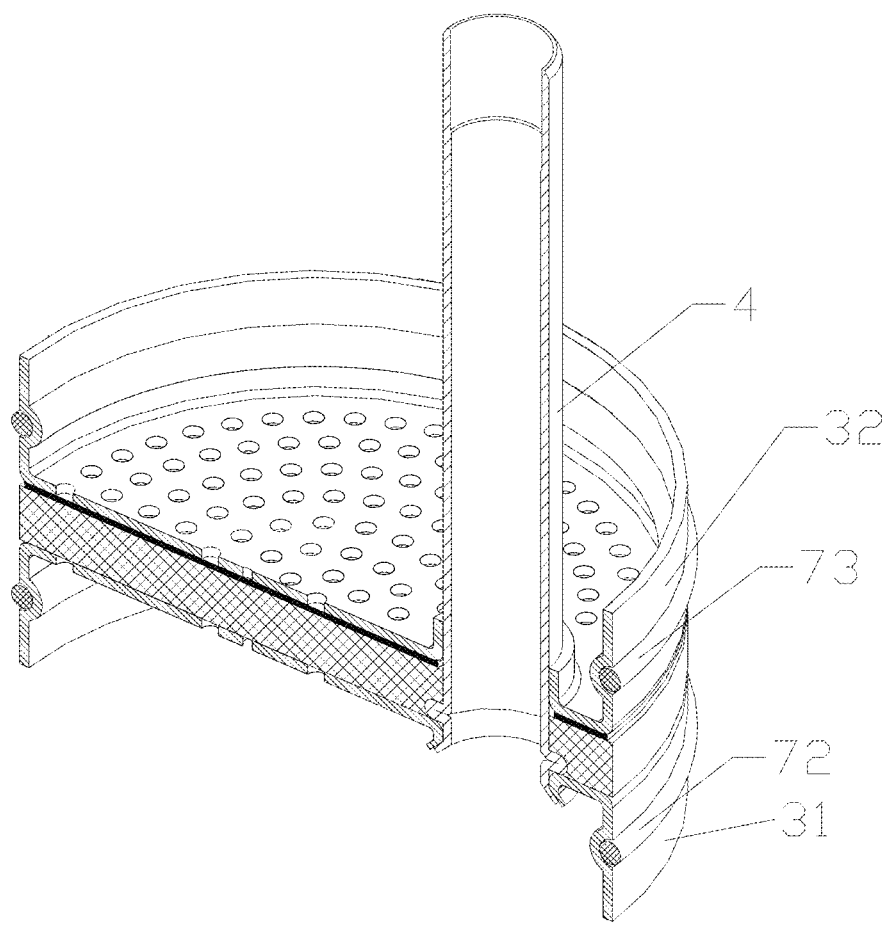
FIG. 9 is a perspective sectional view showing the flow guiding pipe and the filter assembly of the liquid reservoir shown in FIG. 1.

The technical solutions according to the embodiments of the present application will be described clearly and completely as follows in conjunction with the drawings in the embodiments of the present application. It is apparent that the described embodiments are only a part of the embodiments according to the present application, rather than all the embodiments. Any other embodiments obtained by those skilled in the art based on the embodiments of the present disclosure without any creative work fall within the protection scope of the present disclosure.

Referring to FIGS. 1 to 9, a liquid reservoir 100 includes a cover 1, a housing 2, a filter assembly 3, a flow guiding pipe 4, a sieve 5, and a gasket 6. The cover 1 is partially arranged in the housing 2, and the cover 1 is hermetically fixed to the housing 2. One end of the flow guiding pipe 4 is connected to the cover 1. The sieve 5 is fixed to the cover 1.

The cover 1 includes a peripheral wall portion 11 and a shoulder portion 12. An equivalent diameter of an outer peripheral side of the shoulder portion 12 is greater than an equivalent diameter of an inner peripheral side of the peripheral wall portion 11. An open end of the housing 2 includes a mating portion 22, and the mating portion 22 is in cooperation with the shoulder portion 12 to limit the position of the shoulder portion 12, so that the position of the cover can be limited by the housing through its cooperation with the housing. The peripheral wall portion 11 may be in clearance fit with an inner side wall of the housing 2, which facilitates assembling the cover to the housing. The cover 1 is fixed to the housing 2 by welding. The cover 1 has a first port 13 and a second port 14, one of the first port 13 and the second port 14 serves as a refrigerant inlet, and the other of the first port 13 and the second port 14 serves as a refrigerant outlet. The housing 2 has a liquid storage cavity 23, and the second port 14 is in communication with the liquid storage cavity 23. An end of the cover 1 facing a bottom portion of the housing 2 is defined as a first end portion 17 of the cover. The first end portion 17 of the cover faces a molecular sieve 34, and the first end portion 17 of the cover is provided with a first position-limiting recess 15 and a second position-limiting recess 16. The first position-limiting recess 15 and the second position-limiting recess 16 are recessed from the first end portion 17 of the cover. The first position-limiting recess 15 is in communication with the first port 13, and the second position-limiting recess 16 is in communication with the second port 14. An end of the flow guiding pipe 4 is located in the first position-limiting recess 15. The flow guiding pipe 4 includes a first side wall portion 41, a first end port 42, and a second end port 43. The first end port 42 and the second end port 43 are respectively located at two ends of the flow guiding pipe 4. The first port 13 is in communication with the first end port 42 and the second end port 43 is in communication with the liquid storage cavity 23, so that the first port is in communication with the liquid storage cavity. The first side wall portion 41 is located on an outer peripheral side of the flow guiding pipe 4 in a radial direction. The first side wall portion 41 may be in clearance fit with an inner side wall of the first position-limiting recess 15, so as to facilitate the installation of the flow guiding pipe with the cover. The first side wall portion 41 is further provided with a guide side surface 411 which is opposite to the side wall of the first position-limiting recess 15 to facilitate the installation of the flow guiding pipe with the first position-limiting recess. It is also applicable that, according to actual conditions, the inner side wall of the first position-limiting recess 15 is provided with an inclined portion 18, and the inclined portion 18 is opposite to the flow guiding pipe 4, which also facilitates the installation of the flow guiding pipe with the cover. The cover includes at least one groove portion. In this embodiment, the cover 1 includes a groove portion 151. Apparently, different numbers of groove portions may be provided according to actual conditions. The groove portion 151 is arranged on the inner side wall of the first position-limiting recess 15. The liquid reservoir 100 further includes a first seal 71 which is partially located in the groove portion 151. The first seal 71 is in close contact with the outer peripheral side of the flow guiding pipe 4, and is capable of sealing the cover and the flow guiding pipe to prevent the internal leakage of the refrigerant.

The sieve 5 is fixed to the first end portion 17 of the cover, and is arranged in the housing 2. The sieve 5 includes a filter portion 51 and a flange portion 52, and the flange portion 52 extends outward from the filter portion 51. The flange portion 52 abuts against an inner side wall of the second position-limiting recess 16, and abuts against a bottom wall of the second position-limiting recess 16, so that the sieve is mounted in the second position-limiting recess with its position being limited by the same. An outer peripheral side wall of the gasket 6 is in interference fit with the inner side wall of the second position-limiting recess 16. A bottom wall of the gasket 6 abuts against the flange portion 52, and the flange portion 52 is arranged between the bottom wall of the second position-limiting recess 16 and the bottom wall of the gasket 6. At least part of the gasket 6 is arranged in the second position-limiting recess 16. The positions of the sieve 5 and the gasket 6 are limited by the second position-limiting recess 16, and the sieve is mounted in the second position-limiting recess with its position being limited by the second position-limiting recess via the gasket. The sieve 5 includes multiple meshes 53. The meshes 53 are in communication with the second port 14, so that the refrigerant can be filtered by the sieve.

The filter assembly 3 includes a first position-limiting assembly 32, a second position-limiting assembly 31, a filter member 33, and the molecular sieve 34. The filter assembly 3 is arranged in the housing 2. The second position-limiting assembly 31 faces the bottom portion of the housing 2, and the first position-limiting assembly 32 faces the cover 1. The first position-limiting assembly 32 is opposite to the second position-limiting assembly 31. The filter member 33 is arranged between the first position-limiting assembly 32 and the second position-limiting assembly 31. One side of the filter member 33 abuts against the first position-limiting assembly 32. Specifically, the filter member 33 abuts against an outer bottom wall of the first position-limiting assembly 32, and another side of the filter member 33 abuts against the second position-limiting assembly 31, so that the filter member is limited between the first position-limiting assembly and the second position-limiting assembly, so as to prevent the filter member from moving under the excessive flushing force of the refrigerant and prevent the filtering effect from being adversely affected. The second position-limiting assembly 31 includes a second position-limiting member 311. The second position-limiting member 311 includes a first position-limiting hole 3111, a third protrusion 31121, a fourth protrusion 31122, and a first bottom portion 3113. The third protrusion 31121 and the fourth protrusion 31122 face away from the filter member 33. The third protrusion 31121 protrudes from an inner peripheral edge of the first bottom portion 3113 toward a side away from the filter member 34. The fourth protrusion 31122 protrudes from an outer peripheral edge of the first bottom portion 3113 toward the side away from the filter member 34. The first position-limiting hole 3111 penetrates through the first bottom portion 3113. An inner side wall of the first position-limiting hole 3111 is the inner side wall of the third protrusion 31121. A part of the outer side wall of the flow guiding pipe 4 is limited by and in cooperation with the inner side wall of the third protrusion 31121. The inner side wall of the third protrusion 31121 is located on the outer peripheral side of the part of the outer side wall of the flow guiding pipe 4. The outer side wall of the flow guiding pipe 4 is in interference fit with the inner side wall of the third protrusion 31121. An end portion of the flow guiding pipe 4 is substantially flush with a free end of the third protrusion 31121, so that the flow guiding pipe is fixed to the second position-limiting member. An outer side wall of the fourth protrusion 31122 is located on an inner peripheral side of a part of the inner side wall of the housing 2. The outer side wall of the fourth protrusion 31122 is in clearance fit with the inner side wall of the housing 2 to facilitate the installation of the second position-limiting member with the housing. The flow guiding pipe 4 includes a protrusion 44 and a main body wall portion 45. The protrusion 44 protrudes from an outer peripheral side of the main body wall portion 45. The protrusion is limited by and in cooperation with the second position-limiting assembly; or, the protrusion is limited by and in cooperation with the first position-limiting assembly. In this embodiment, the protrusion 44 abuts against the second position-limiting assembly 31. Specifically, the protrusion 44 abuts against the first bottom portion 3113, so that the position of the flow guiding pipe is limited by the second position-limiting assembly.

The first position-limiting assembly 32 at least includes a first position-limiting member 321. The first position-limiting member 321 includes a position-limiting hole 3211, a first protrusion 32121, a second protrusion 32122, and a bottom portion 3213. The first protrusion 32121 protrudes from an inner peripheral edge of the bottom portion 3213 toward a side away from the filter member 34. The position-limiting hole 3211 penetrates through the bottom portion 3213. An inner side wall of the position-limiting hole 3211 is the inner sidewall of the first protrusion 32121. A part of the outer side wall of the flow guiding pipe 4 is limited by and in cooperation with an inner side wall of the first protrusion 32121. The inner side wall of the first protrusion 32121 is located on the outer peripheral side of the part of the outer side wall of the flow guiding pipe 4. The outer side wall of the flow guiding pipe 4 may be in clearance fit, in particular a small clearance fit, with the inner side wall of the first protrusion 32121. A radial distance between the outer side wall of the flow guiding pipe 4 and the inner side wall of the first protrusion 32121 is 0 to 0.25 mm, which facilitates the installation of the flow guiding pipe with the first position-limiting member. The second protrusion 32122 protrudes from an outer peripheral edge of the bottom portion 3213 toward a side away from the filter member 34. An outer side wall of the second protrusion 32122 is located on an inner peripheral side of a part of the inner side wall of the housing 2. The outer side wall of the second protrusion 32122 may be in clearance fit, in particular a small clearance fit, with the inner side wall of the housing 2. A radial distance between the second protrusion 32122 and the inner side wall of the housing 2 is 0 to 0.28 mm, which facilitates the installation of the first position-limiting member with the housing and prevents the inner wall of the housing from being scratched during the installation of the first position-limiting assembly.

The housing includes at least one position-limiting protrusion. The position-limiting protrusion protrudes from the inner side wall of the housing. The second position-limiting assembly is limited by and in cooperation with the position-limiting protrusion. The fourth protrusion is limited by and in cooperation with the position-limiting protrusion. The position of the housing is limited by the first position-limiting member. In this embodiment, the housing 2 includes a position-limiting protrusion 21 which protrudes from the inner side wall of the housing 2. The position-limiting protrusion 21 includes a first position-limiting protrusion 24 and a second position-limiting protrusion 25. A distance between the first position-limiting protrusion 24 and the cover 1 is greater than a distance between the second position-limiting protrusion 25 and the cover 1. The second position-limiting assembly 31 is limited by the position-limiting protrusion 21, and the fourth protrusion 31122 is limited by and in cooperation with the position-limiting protrusion 21, thereby realizing the axial position-limiting of the second position-limiting member with respect to the housing. The first position-limiting member 321 is limited by the housing 2, thereby realizing the axial position-limiting of the first position-limiting member with respect to the housing. The liquid reservoir 100 includes a first cavity 1001, a second cavity 1002, and a third cavity 1003. The first cavity 1001 includes at least a region on one side of the first position-limiting assembly 32, the second cavity 1002 includes at least a region on one side of the second position-limiting assembly 31, and the third cavity 1003 includes at least a region between the first position-limiting assembly 32 and the second position-limiting assembly 31. The first position-limiting member 321 further includes a through hole 3215, and the through hole 3215 penetrates through the bottom portion 3213. The second position-limiting assembly 31 at least includes the second position-limiting member 311. A bottom portion of the second position-limiting member 311 includes a communication hole 3115. The first cavity 1001 communicates with the third cavity 1003 through the through hole 3215, and the second cavity 1002 communicates with the third cavity 1003 through the communication hole 3115, so that the refrigerant can pass through the first position-limiting member and the second position-limiting member to be filtered by the filter member. The molecular sieve 34 is arranged on one side of the first position-limiting assembly 32, and the molecular sieve can absorb moisture in the refrigerant.

The first position-limiting assembly includes at least one filter sieve, and the filter sieve is fixed to the bottom portion; and/or the second position-limiting assembly includes at least one filter sieve, and the filter sieve is fixed to the first bottom portion. In this embodiment, the first position-limiting assembly 32 includes one filter sieve 35. Apparently, different numbers of filter sieves may be provided according to actual needs, and the second position-limiting assembly may include the filter sieve as well. The filter sieve 35 is fixed to the outer bottom wall of the bottom portion 3213, which further improves the filtering effect of the liquid reservoir.

The first position-limiting assembly and/or the second position-limiting assembly include at least one recess, and the recess is recessed from an outer peripheral wall of the first position-limiting assembly and/or the second position-limiting assembly toward the flow guiding pipe. In this embodiment, the recess includes a first recess 3114 and a second recess 3214. The second position-limiting assembly 31 includes the first recess 3114, and the first recess 3114 is recessed from the outer peripheral wall of the second position-limiting assembly 31 toward the flow guiding pipe 4. Specifically, the first recess 3114 is recessed from an outer wall of the fourth protrusion 31122 toward the third protrusion 31121. The first position-limiting assembly 32 includes the second recess 3214. The second recess 3214 is recessed from the outer peripheral wall of the first position-limiting assembly 32 toward the flow guiding pipe 4. Specifically, the second recess 3214 is recessed from an outer wall of the second protrusion 32122 toward the first protrusion 32121. Apparently, only one of the second position-limiting assembly and the first position-limiting assembly is provided with the recess according to actual needs. The liquid reservoir further includes at least one seal, and the seal is partially located in the recess. In this embodiment, the liquid reservoir 100 includes a second seal 72 and a third seal 73. The second seal 72 is partially arranged in the first recess 3114, and the third seal 73 is partially arranged in the second recess 3214. The second seal 72 is in close contact with the inner peripheral wall of the housing 2, the third seal 73 is in close contact with an inner peripheral side wall of the housing 2, and thus the second position-limiting assembly and the first position-limiting assembly are hermetically connected to the housing to prevent the internal leakage of the refrigerant. Apparently, a corresponding number of seals may be provided according to the number of recesses.

Herein, the compression ratio of the seal may be 15% to 30%, which is conducive to the installation of the position-limiting assembly and the seal.

While the liquid receiver is in operation, in a case that the cover 1 is located below the housing 2, the refrigerant flows in through the first port 13 and then enters the housing 1 through the flow guiding pipe 4, the molecular sieve 34 absorbs the moisture in the refrigerant, then the refrigerant is filtered by the second position-limiting assembly 31, the filter member 33, and the first position-limiting assembly 32, part of the liquid refrigerant flows out of the liquid reservoir 100 from the second port 14 through the sieve 5, and the gaseous refrigerant is within the liquid storage cavity 23, such that impurity filtration, moisture absorption, and gas-liquid separation of the refrigerant are realized. In practical use, a flow direction of the refrigerant may be contrary to the above process. In a case that the cover 1 is located above the housing 2, the refrigerant flows in through the second port 14 and then enters the housing 1 through the sieve 5, the refrigerant is filtered by the first position-limiting assembly 32, the filter member 33, and the second position-limiting assembly 31, the molecular sieve 34 absorbs the moisture in the refrigerant, part of the liquid refrigerant flows out of the liquid reservoir 100 from the first port 13 through the flow guiding pipe 4, and the gaseous refrigerant is within the liquid storage cavity 23, such that impurity filtration, moisture absorption, and gas-liquid separation of the refrigerant are realized.

Figure 10:
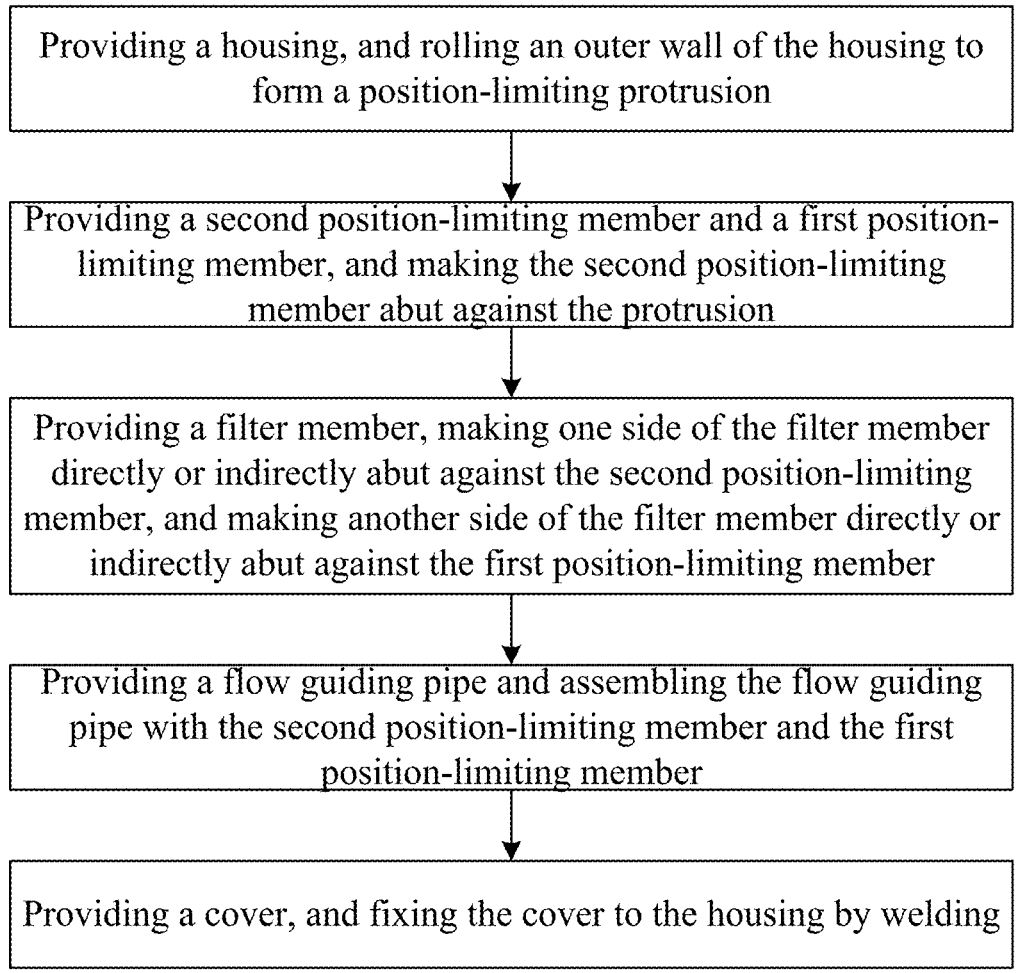
FIG. 10 is a schematic flowchart of a method for manufacturing the liquid reservoir according to the first embodiment.
Figure 11:
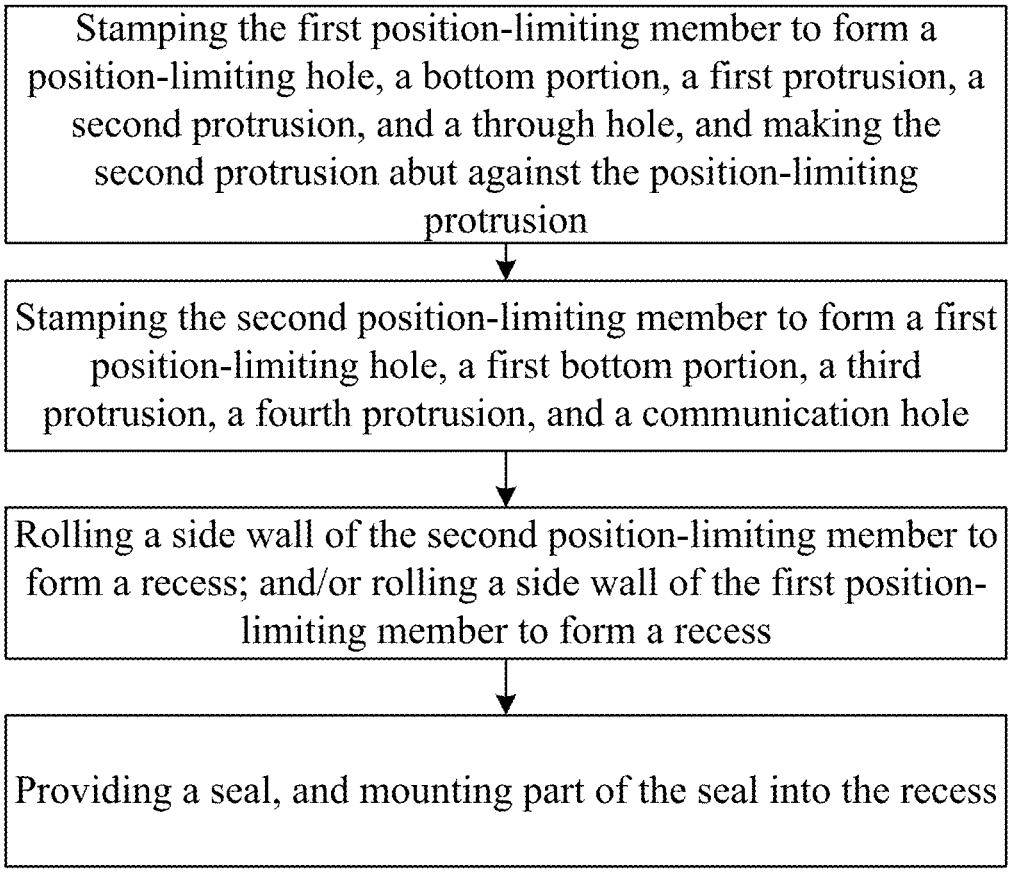
FIG. 11 is a schematic flowchart of a method for manufacturing components in the liquid reservoir according to the first embodiment.
Figure 12:
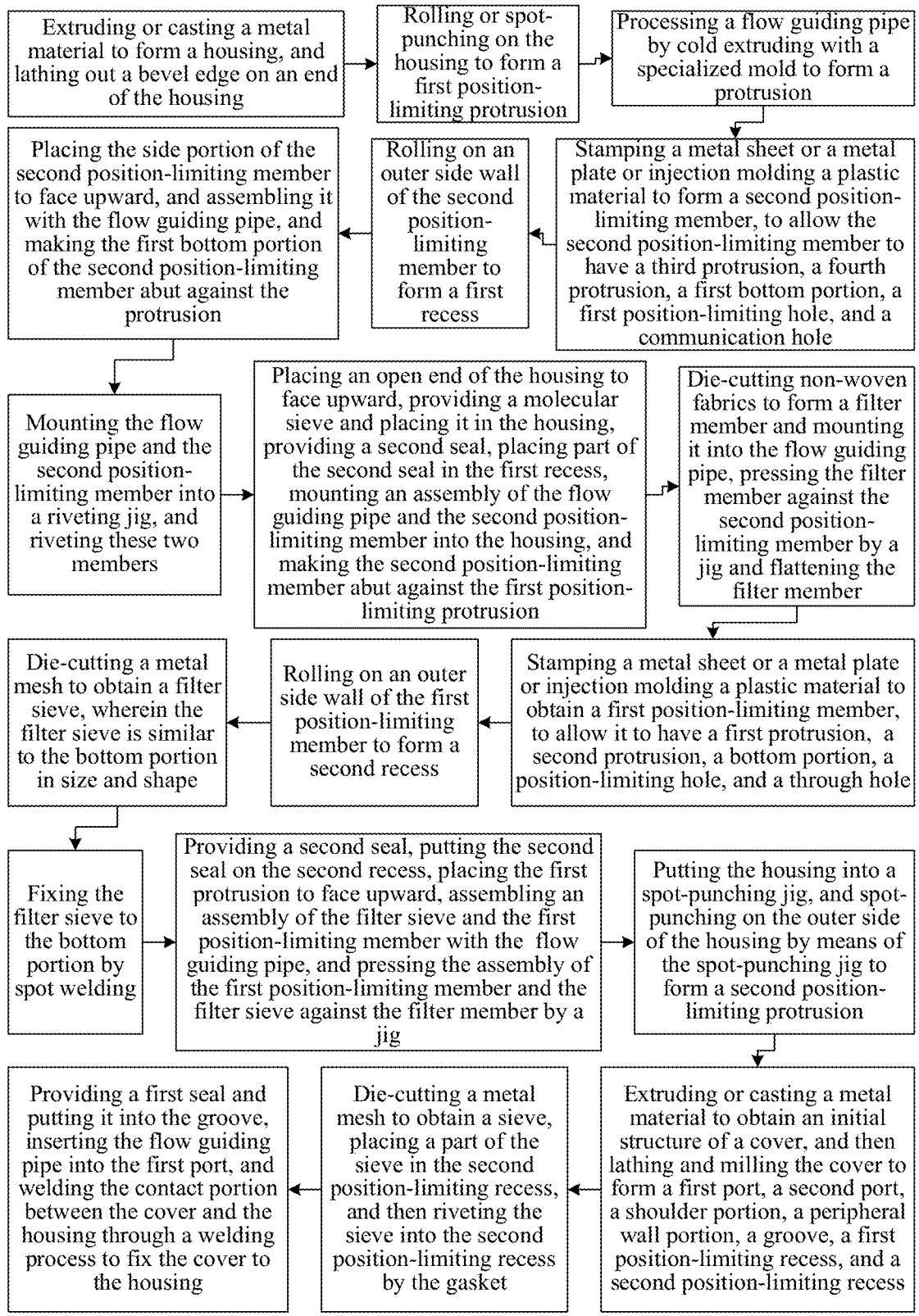
FIG. 12 is a schematic flowchart of a detailed method for manufacturing the liquid reservoir according to the first embodiment.

Referring to FIGS. 10 to 12, a method for manufacturing the liquid reservoir 100 in this embodiment mainly includes the following steps:

A housing 2 is formed by extruding a metal materials or casting a metal material, then a bevel edge is lathed on an end of the housing, and a first position-limiting protrusion 24 is machined on the outer side wall of the housing 2 by rolling or spot-punching.

A flow guiding pipe 4 is provided, a protrusion 44 is formed by a cold extrusion process by means of a specialized mold, a second position-limiting member 311 is formed by stamping a metal sheet, or stamping a metal plate, or injection molding a plastic material, to allow the second position-limiting member to have a first position-limiting hole 3111, a third protrusion 31121, a fourth protrusion 31122, and a first bottom portion 3113, a first recess 3114 is formed on the outer side wall of the second position-limiting member 311 by rolling, and the second position-limiting member 311 and the flow guiding pipe 4 are assembled together and then fixed by riveting; or the second position-limiting member 311 is connected to the flow guiding pipe 4 by injection molding.

An open end of the housing 2 is placed to face upward, a molecular sieve 34 is provided and placed in the housing 2, a second seal 72 is provided and placed in the first recess 3114, an assembly of the second position-limiting member 311, the second seal 72 and the flow guiding pipe 4 is placed into the housing 2, and then the first position-limiting protrusion 24 abuts against the second position-limiting member 311.

A filter member 33 is formed by die-cutting non-woven fabrics, the filter member 33 is assembled with the flow guiding pipe 4, then the filter member 33 is pressed against the second position-limiting member 311 by a jig, and then the filter member 33 is flattened.

A first position-limiting member 321 is formed by stamping a metal sheet or stamping a metal plate or injection molding a plastic material.

A second recess 321 is formed by rolling on the outer side wall of the first position-limiting member 321.

A filter sieve 35 is formed by die-cutting a metal mesh, and the metal filter sieve 35 is fixed to the first position-limiting member 321 by spot welding.

Apparently, the processing of the filter member 33, the first position-limiting member 321, and the filter sieve 35 may be performed at the same time. A third seal 73 is provided and placed in the second recess 321, an assembly of the first position-limiting member 321, the third seal 73 and the filter sieve 35 is assembled with the flow guiding pipe 4 and then placed in the housing 2, and then the first position-limiting member 321 is pressed against the filter member 33 by a jig. A second position-limiting protrusion 25 is formed on the side wall of the housing 2 by spot-punching, and the second position-limiting protrusion 25 abuts against the first position-limiting member 321 to fix the first position-limiting member 321.

An initial structure of the cover 1 is formed by extruding a metal material or casting a metal material, then the cover 1 is formed by lathing and milling, to allow the cover 1 to have a first port 13, a second port 14, a shoulder portion 12, a peripheral wall portion 11, a groove portion 151, a first position-limiting recess 15, and a second position-limiting recess 16.

A sieve 5 and a gasket 6 are provided, the metal mesh is die-cut to form an initial structure of the sieve by a special mold, the gasket 6 is formed by cutting a pipe, the sieve 5 is partially placed in the second position-limiting recess 16, then the gasket 6 is placed in the second position-limiting recess 16, and the gasket 6 is in interference fit with the second position-limiting recess 16.

A first seal 71 is provided and mounted in the groove portion 151 of the cover 1, the flow guiding pipe 4 is placed in the first port 13, an assembly of the cover 1, the sieve 5 and the gasket 6 is partially placed in the housing 2, and the cover 1 is sealed to the housing 2 by argon arc welding; or the cover 1 is sealed to the housing 2 by vacuum electron beam welding; or the cover 1 is sealed to the housing 2 by friction stir welding.

For the liquid reservoir manufactured according to the above method, the internal structure of the filter assembly is more stable, which relatively improves the filtering effect of the liquid reservoir.

Figure 13:
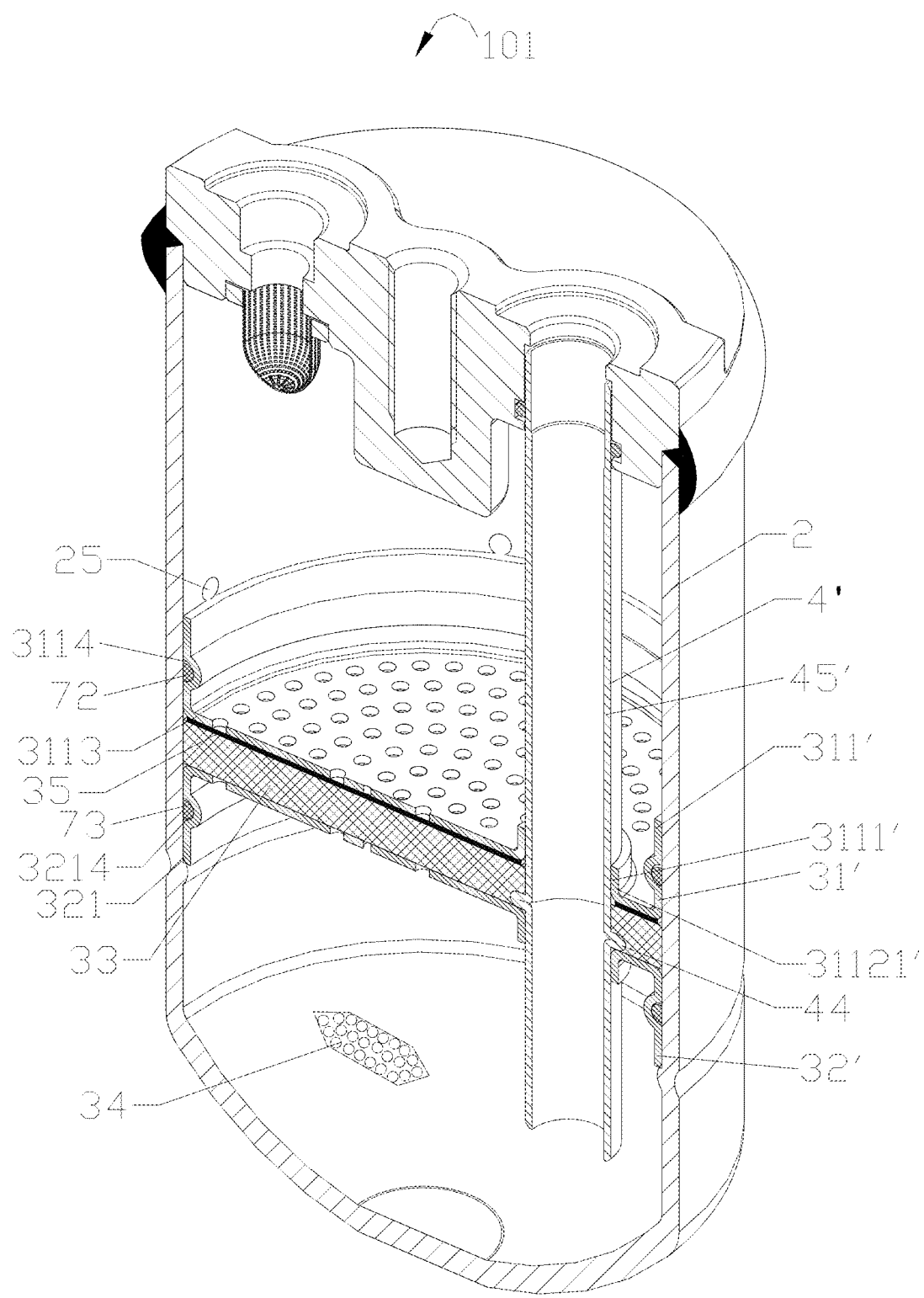
FIG. 13 is a perspective sectional view of the liquid reservoir according to a second embodiment.

Referring to FIG. 13, a liquid reservoir 101 according to a second embodiment includes a flow guiding pipe 4'. A second position-limiting assembly 31' includes a second position-limiting member 311'. The second position-limiting member 311' includes a first position-limiting hole 3111', a third protrusion 31121', and a first bottom portion 3113. The first position-limiting hole 3111' penetrates through the first bottom portion 3113. A side wall of the first position-limiting hole 3111' is an inner side wall of the third protrusion 31121', and an outer side wall of the flow guiding pipe 4' is in clearance fit with the inner side wall of the third protrusion 31121', which facilitates the installation of the flow guiding pipe with the second position-limiting member. The flow guiding pipe 4' penetrates through the first position-limiting assembly 32'. The flow guiding pipe 4' includes a protrusion 44 and a main body wall portion 45'. The protrusion 44 protrudes from an outer peripheral side of the main body wall portion 45'. The protrusion 44 abuts against with the first position-limiting assembly 32', so that the position of the flow guiding pipe is limited by the first position-limiting assembly. The second position-limiting assembly includes at least one filter sieve. In this embodiment, the second position-limiting assembly 31' includes one filter sieve 35, and the filter sieve 35 is fixed to the first bottom portion 3113. The structures and positional relationships of other components in the liquid reservoir 101 are similar to those of the liquid reservoir 100, which will not be described herein again.

A method for manufacturing the liquid reservoir 101 in this embodiment mainly includes the following steps:

An open end of the housing 2 is placed flat, a molecular sieve 34 is provided and placed in the housing, a third seal 73 is provided and placed in the second recess 3214, an assembly of the first position-limiting member 321, the third seal 73 and the flow guiding pipe 4' is placed into the housing 2, and the first position-limiting protrusion 24 abuts against the first position-limiting member 321.

The open end of the housing 2 is placed to face upward, a filter member 33 is formed by die-cutting non-woven fabrics, the filter member 33 is assembled with the flow guiding pipe 4, then the filter member 33 is pressed against the first position-limiting member 321 by a jig, and the filter member 33 is flattened.

A filter sieve 35 is provided and is fixed to the second position-limiting member 311' by spot welding.

A second seal 72 is provided and placed in the first recess 3114, an assembly of the second position-limiting member 311', the second seal 72 and the filter sieve 35 is assembled with the flow guiding pipe 4' and then placed in the housing 2, and then the second position-limiting assembly 31' is pressed against the filter member 33 by a jig.

A second position-limiting protrusion 25 is formed on the side wall of the housing 2 by spot-punching, and the second position-limiting protrusion 25 abuts against the second position-limiting assembly 31' to fix the second position-limiting assembly 31'.

The processing methods of the components in the liquid reservoir 101 are similar to those of the first embodiment, which will not be described herein again.

For the liquid reservoir manufactured according to the above method, the internal structure of the filter assembly is more stable, which relatively improves the filtering effect of the liquid reservoir.

Figure 14:
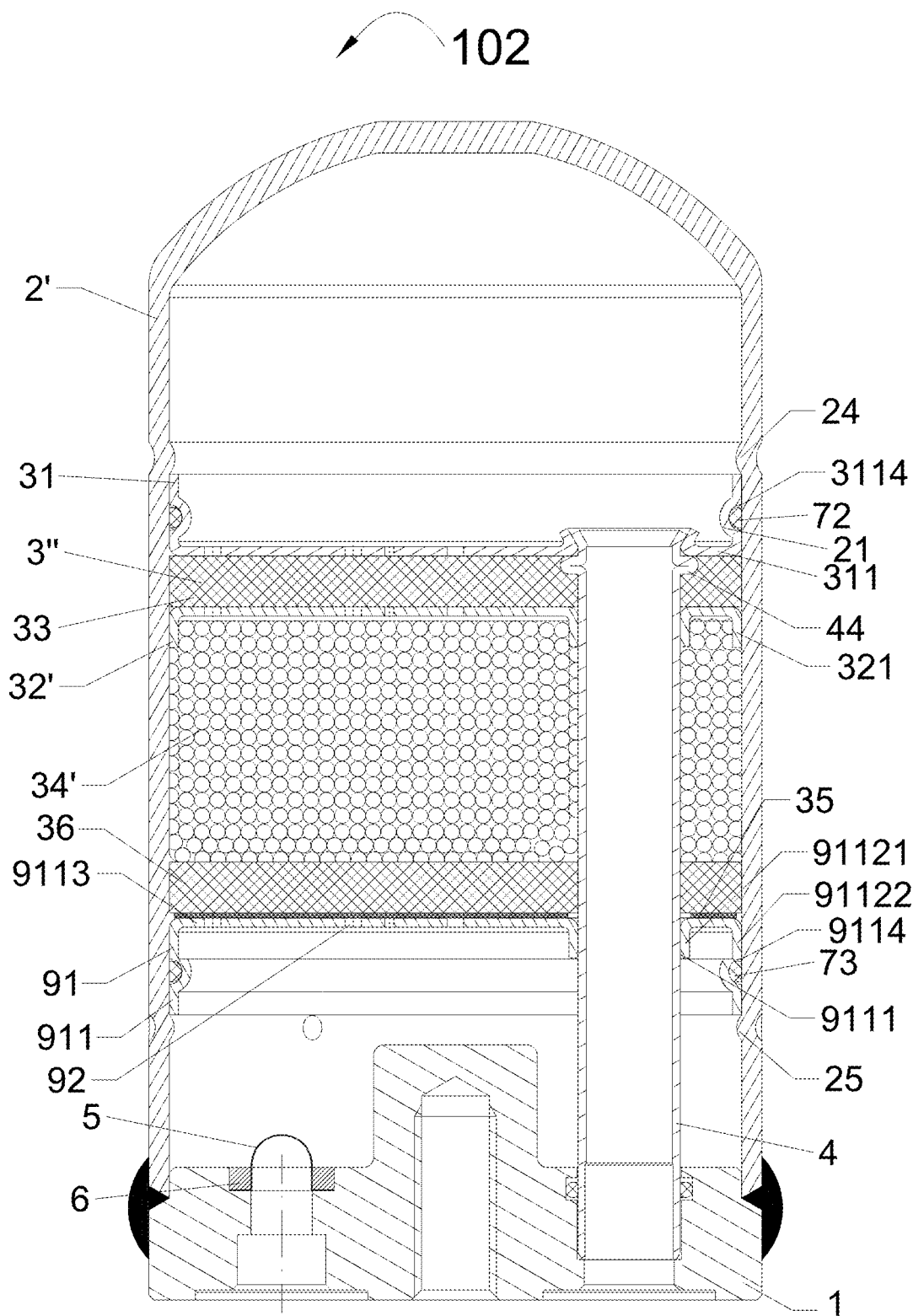
FIG. 14 is a schematic sectional view of the liquid reservoir according to a third embodiment.

Referring to FIG. 14, a liquid reservoir 102 according to a third embodiment includes a cover 1, a housing 2', a filter assembly 3", and a flow guiding pipe 4. The filter assembly 3" includes a second position-limiting assembly 31, a first position-limiting assembly 32', a filter member 33, a third position-limiting assembly 91, a filter pad 36, and a molecular sieve 34'. One side of the filter pad 36 abuts against the third position-limiting assembly 91, and another side of the filter pad 36 abuts against the molecular sieve 34'. The molecular sieve 34' is placed between the filter pad 36 and the first position-limiting assembly 32', one side of the molecular sieve 34' abuts against the filter pad 36, and another side of the molecular sieve 34' abuts against the first position-limiting assembly 32'. The positions of the second position-limiting assembly 31 and the third position-limiting assembly 91 are limited by the housing 2'. The third position-limiting assembly 91 includes a third position-limiting member 911. The third position-limiting member 911 includes a fifth protrusion 91121, a sixth protrusion 91122, a second position-limiting hole 9111, and a second bottom portion 9113. The filter pad 36 abuts against an outer bottom wall of the third position-limiting assembly 91. The fifth protrusion 91121 protrudes from an inner peripheral edge of the second bottom portion 9113 toward a side away from the filter pad 36, and the sixth protrusion 91122 protrudes from an outer peripheral edge of the second bottom portion 9113 toward a side away from the filter pad 36. The second position-limiting hole 9111 penetrates through the second bottom portion 9113. An inner side wall of the second position-limiting hole 9111 is the inner side wall of the fifth protrusion 91121. A part of the outer side wall of the flow guiding pipe 4 is limited by and in cooperation with the inner side wall of the fifth protrusion 91121. The inner side wall of the fifth protrusion 91121 is arranged on an outer peripheral side of the part of the outer side wall of the flow guiding pipe 4, and the protrusion 44 is limited by and in cooperation with the third position-limiting assembly 91. An outer side wall of the sixth protrusion 91122 is arranged on an inner peripheral side of a part of the inner side wall of the housing 2'. The outer side wall of the flow guiding pipe 4 is in clearance fit with the inner side wall of the fifth protrusion 91121. The outer side wall of the sixth protrusion 91122 is in clearance fit with the part of the inner side wall of the housing 2', which facilitates the installation of the third position-limiting assembly with the housing. The third position-limiting member 911 further includes a through hole 92, and the through hole 92 penetrates through the second bottom portion 9113. The second position-limiting assembly and/or the third position-limiting assembly include at least one recess, and the recess is recessed from an outer peripheral wall of the second position-limiting assembly and/or the third position-limiting assembly toward the flow guiding pipe. In this embodiment, the second position-limiting assembly 31 includes a first recess 3114, and the third position-limiting assembly 91 includes a second recess 9114. The first recess 3114 is recessed from an outer peripheral wall of the second position-limiting assembly 31 toward the flow guiding pipe 4, and the second recess 9114 is recessed from an outer peripheral wall of the third position-limiting assembly 91 toward the flow guiding pipe 4. The liquid reservoir further includes at least one seal, and the seal is in close contact with an inner peripheral wall of the housing. In this embodiment, the liquid reservoir 102 includes a second seal 72, and a third seal 73. The second seal 72 is partially located in the first recess 3114, the third seal 73 is partially located in the second recess 9114, and the second seal 72 and the third seal 73 are in close contact with the inner peripheral side of the housing 2'. The housing 2' includes a position-limiting protrusion 21, and the position-limiting protrusion 21 includes a first position-limiting protrusion 24 and a second position-limiting protrusion 25 which both protrude from the inner side all of the housing 2' toward the flow guiding pipe 4. The sixth protrusion 91122 is limited by and in cooperation with the position-limiting protrusion 21, the third position-limiting assembly 91 is limited by and in cooperation with the first position-limiting protrusion 24, and the second position-limiting assembly 31 is limited by and in cooperation with the second position-limiting protrusion 25, so that the positions of the second position-limiting assembly and the third position-limiting assembly are limited by the housing. The third position-limiting assembly includes at least one filter sieve, and the filter sieve is fixed to the second bottom portion. In this embodiment, the third position-limiting assembly 91 includes a filter sieve 35, and the filter sieve 35 is fixed to the second bottom portion 9113.

Figure 15:
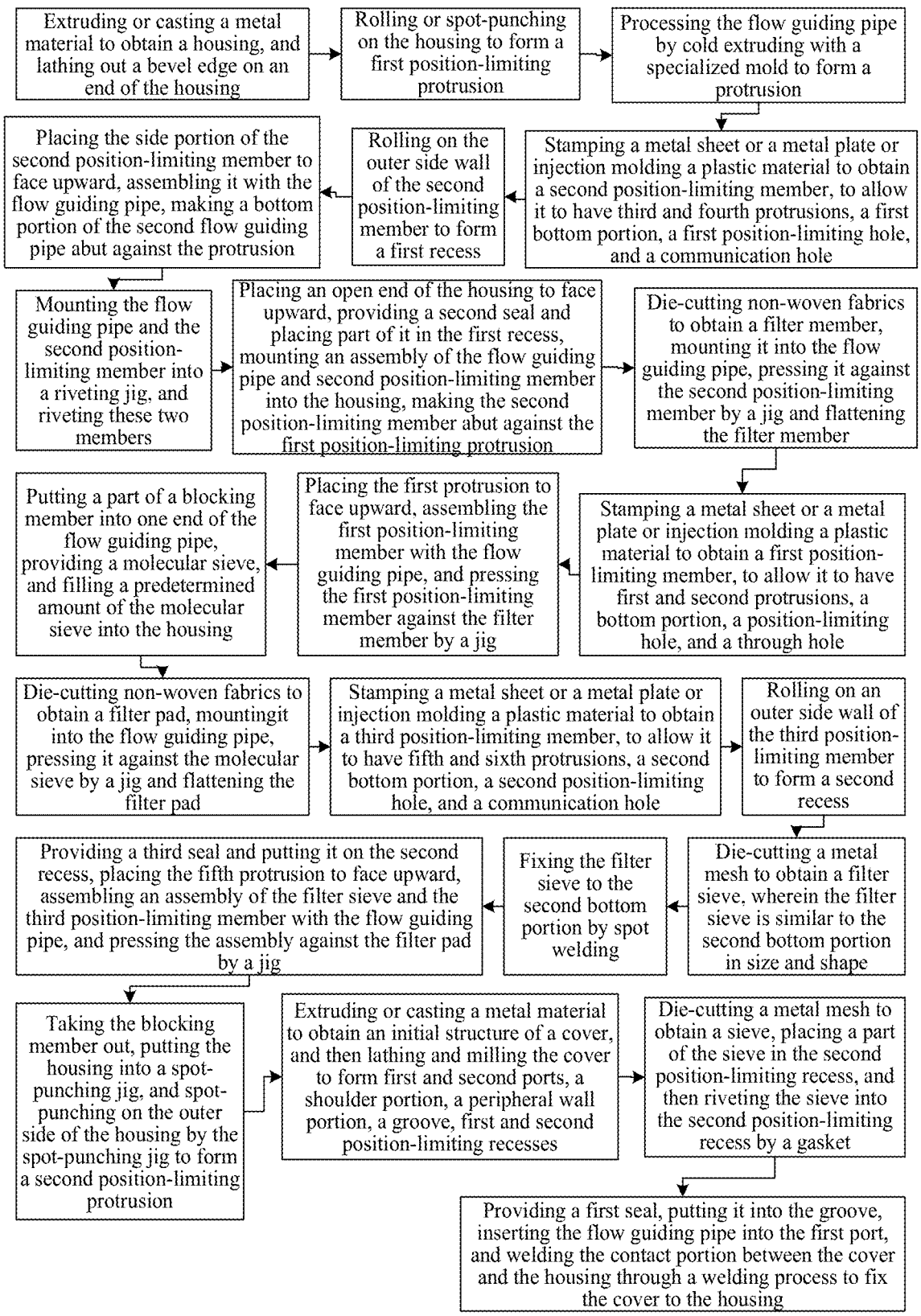
FIG. 15 is a schematic flowchart of a method for manufacturing the liquid reservoir according to the third embodiment.

Referring to FIGS. 14 to 15, a method for manufacturing the liquid reservoir 102 in this embodiment mainly includes the following steps:

An open end of the housing 2' is placed to face upward, a blocking member is partially mounted into one end of the flow guiding pipe 4, and a predetermined amount of the molecular sieve 34' is placed into the cavity of the housing 2'.

A filter pad 36 is formed by die-cutting non-woven fabrics, the filter pad 36 is assembled with the flow guiding pipe 4, then the filter member 36 is pressed against the molecular sieve 34' by a jig, and then the filter pad 36 is flattened.

A third position-limiting member 911 is formed by stamping a metal sheet, or stamping a metal plate, or injection molding a plastic material, to allow the third position-limiting member 911 to have a fifth protrusion 91121, a sixth protrusion 91122, a second position-limiting hole 9111, and a second bottom portion 9113, and the second recess 9114 is formed on the outer side wall of the third position-limiting member 911 by rolling.

A filter sieve 35 is provided and fixed to the third position-limiting member 911 by spot welding.

A third seal 73 is provided and partially placed in the second recess 9114, an assembly of the third position-limiting member 911, the third seal 73 and the filter sieve 35 is assembled with the flow guiding pipe 4 and then placed in the housing 2', the third position-limiting assembly 91 is pressed against the molecular sieve 34' by a jig, and then the blocking member is taken out.

A second position-limiting protrusion 25 is formed on the side wall of the housing 2' by spot-punching, and the second position-limiting protrusion 25 abuts against the third position-limiting assembly 91 to fix the third position-limiting assembly 91.

The processing technology and installation methods of the second position-limiting member 311, the first position-limiting member 321, the filter member 33, the flow guiding pipe 4, the cover 1, the sieve 5, and the gasket 6 are similar to those of the first embodiment, which will not be described herein again.

For the liquid reservoir manufactured according to the above method, the internal structure of the filter assembly is more stable, which relatively improves the filtering effect of the liquid reservoir.

Figure 16:
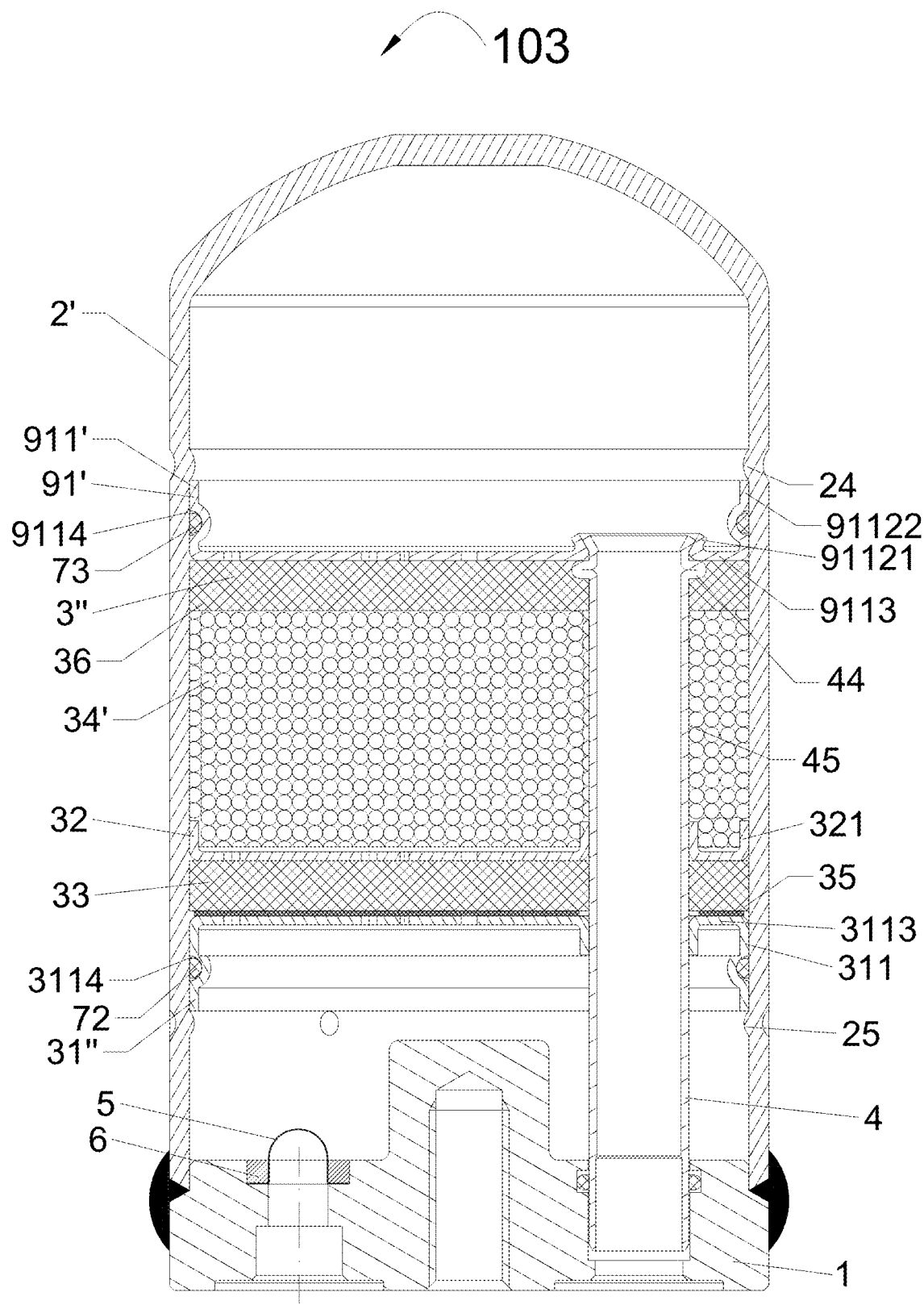
FIG. 16 is a schematic sectional view of the liquid reservoir according to a fourth embodiment.

Referring to FIG. 16, a liquid reservoir 103 according to a fourth embodiment includes a cover 1, a housing 2', a filter assembly 3", and a flow guiding pipe 4. The filter assembly 3" includes a second position-limiting assembly 31", a first position-limiting assembly 32, a filter member 33, a third position-limiting assembly 91', a filter pad 36, and a molecular sieve 34'. The flow guiding pipe 4 includes a protrusion 44 and a main body wall portion 45. The protrusion 44 protrudes from an outer peripheral side of the main body wall portion 45. The protrusion 44 abuts against the third position-limiting member 91'. One side of the filter pad 36 abuts against the third position-limiting assembly 91', another side of the filter pad 36 abuts against the molecular sieve 34', and another side of the molecular sieve 34' abuts against the first position-limiting assembly 32. The positions of the second position-limiting assembly 31" and the third position-limiting assembly 91' are limited by the housing 2'. The third position-limiting assembly 91' includes a fifth protrusion 91121, and an outer side wall of the flow guiding pipe 4 is in interference fit with an inner side wall of the fifth protrusion 91121, so that the third position-limiting assembly is fixed to the flow guiding pipe. The second position-limiting assembly 31" includes a first recess 3114, and the third position-limiting assembly 91' includes a second recess 9114. The first recess 3114 is recessed from an outer peripheral wall of the second position-limiting assembly 31" toward the flow guiding pipe 4, and the second recess 9114 is recessed from an outer peripheral wall of the third position-limiting assembly 91' toward the flow guiding pipe 4. The liquid reservoir 103 includes a second seal 72, and a third seal 73. The second seal 72 is partially located in the first recess 3114, the third seal 73 is partially located in the second recess 9114, and the second seal 72 and the third seal 73 are in close contact with the inner peripheral side of the housing 2'. The housing 2' includes a first position-limiting protrusion 24 and a second position-limiting protrusion 25 which both protrude from the inner side all of the housing 2' toward the flow guiding pipe 4. The third position-limiting assembly 91 abuts against the first position-limiting protrusion 24, and the second position-limiting assembly 31" abuts against the second position-limiting protrusion 25. The second position-limiting assembly includes at least one filter sieve, and the filter sieve is fixed to the first bottom portion. In this embodiment, the second position-limiting assembly 31" includes one filter sieve 35, and the second position-limiting assembly 31" includes a second position-limiting member 311. The second position-limiting member 311 includes a first bottom portion 3113, and the filter sieve 35 is fixed to the first bottom portion 3113.

A method for manufacturing the liquid reservoir 103 in this embodiment mainly includes the following steps:

A flow guiding pipe 4 is provided, a protrusion 44 is formed by a cold extrusion process by means of a specialized mold, a third position-limiting member 911' is formed by stamping a metal sheet, or stamping a metal plate, or injection molding a plastic material, to allow the third position-limiting member 911' to have a fifth protrusion 91121, a sixth protrusion 91122, a second position-limiting hole 9111, and a second bottom portion 9113. A second recess 9114 is formed on the outer side wall of the third position-limiting member 911' by rolling, and the third position-limiting member 911' and the flow guiding pipe 4 are assembled together and then fixed by riveting.

An open end of the housing 2' is placed to face upward, a third seal 73 is provided and placed in the second recess 9114, an assembly of the third position-limiting member 911', the third seal 73 and the flow guiding pipe 4' is placed into the housing 2', and the first position-limiting protrusion 24 abuts against the third position-limiting member 911'.

A filter pad 36 is formed by die-cutting non-woven fabrics, the filter pad 36 is assembled with the flow guiding pipe 4, then the filter member 36 is pressed against the third position-limiting member 911' by a jig, and then the filter pad 36 is flattened.

A blocking member is partially mounted into one end of the flow guiding pipe 4, and a predetermined amount of the molecular sieve 34' is placed into the cavity of the housing 2'.

The first position-limiting member 321 and the filter member 33 are assembled with the flow guiding pipe 4 in sequence, the first position-limiting member 321 is pressed against the molecular sieve 34' by a jig, and then the filter member 33 is flattened.

A filter sieve 35 is provided and fixed to the second position-limiting member 311 by spot welding.

A second seal 72 is provided and partially placed in the first recess 3114, an assembly of the second position-limiting member 311, the second seal 72 and the filter sieve 35 is assembled with the flow guiding pipe 4 and then placed in the housing 2', the second position-limiting assembly 31" is pressed against the filter member 33 by a jig, and then the blocking member is taken out.

A second position-limiting protrusion 25 is formed on the side wall of the housing 2' by spot-punching, and the second position-limiting protrusion 25 abuts against the second position-limiting assembly 31".

The processing technology and installation methods of the second position-limiting member 311, the first position-limiting member 321, the filter member 33, the flow guiding pipe 4, the cover 1, the sieve 5, and the gasket 6 are similar to those of the first embodiment, which will not be described herein again.

For the liquid reservoir manufactured according to the above method, the internal structure of the filter assembly is more stable, which relatively improves the filtering effect of the liquid reservoir.

Figure 17:
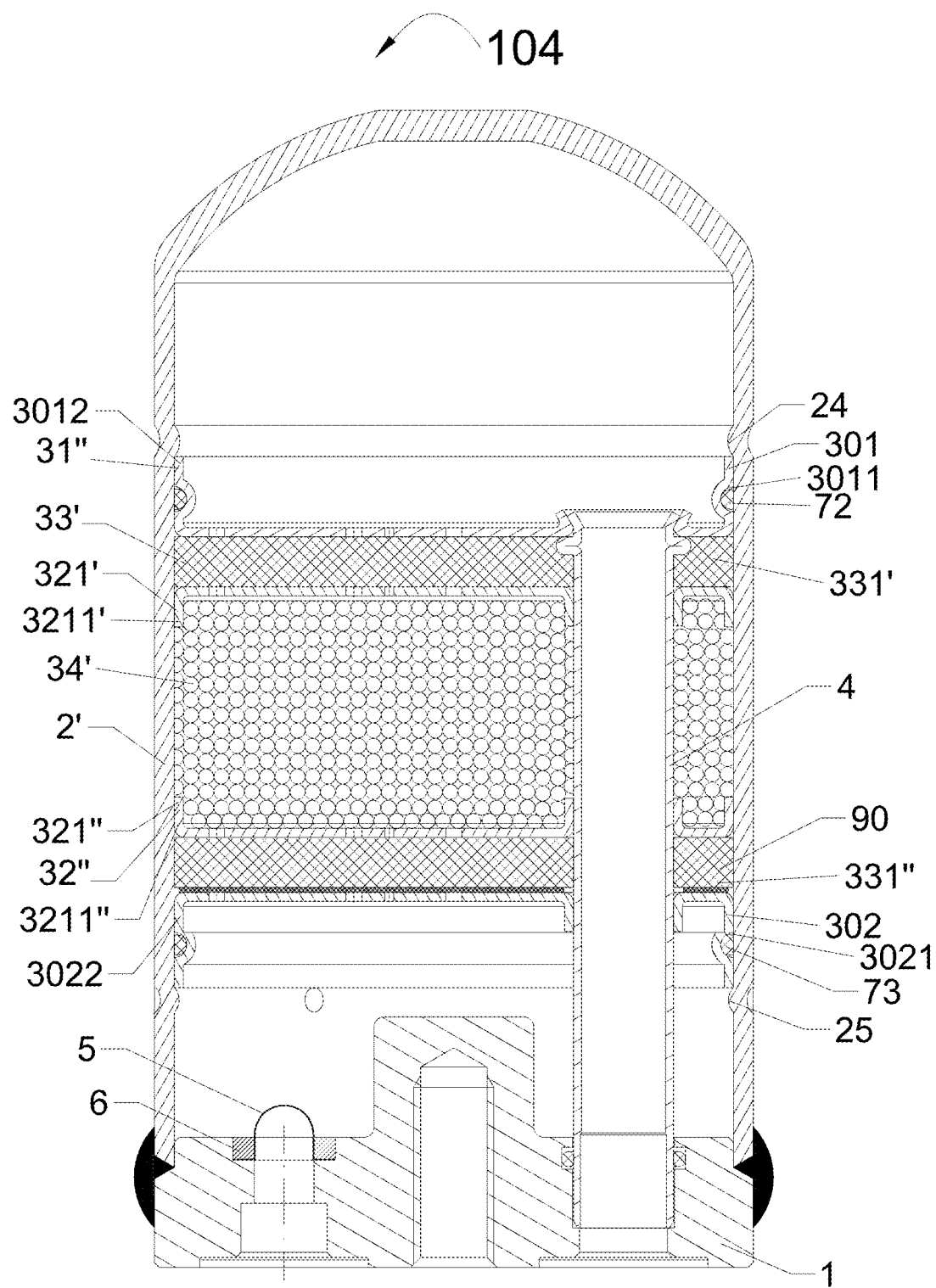
FIG. 17 is a schematic sectional view of the liquid reservoir according to a fifth embodiment.

Referring to FIG. 17, a liquid reservoir 104 according to a fifth embodiment includes a filter assembly 90, a flow guiding pipe 4, and a housing 2'. The filter assembly 90 includes a second position-limiting assembly 31", a first position-limiting assembly 32", a filter member 33', and a molecular sieve 34'. The second position-limiting assembly 31" includes a first sub-assembly 301 of the second position-limiting assembly and a second sub-assembly 302 of the second position-limiting assembly. The first position-limiting assembly 32" includes a first sub-assembly 321' of the first position-limiting assembly and a second sub-assembly 321" of the first position-limiting assembly. The filter member 33' includes a first filter member 331' and a second filter member 331". The first filter member 331' is arranged between the first sub-assembly 321' of the first position-limiting assembly and the first sub-assembly 301 of the second position-limiting assembly. One side of the first filter member 331' abuts against the first sub-assembly 321' of the first position-limiting assembly, and another side of the first filter member 331' abuts against the first sub-assembly 301 of the second position-limiting assembly, so that the position of the first filter member is limited between the first sub-assembly of the first position-limiting assembly and the first sub-assembly of the second position-limiting assembly. The second filter member 331" is arranged between the second sub-assembly 321" of the first position-limiting assembly and the second sub-assembly 302 of the second position-limiting assembly. One side of the second filter member 331" abuts against the second sub-assembly 321" of the first position-limiting assembly, and another side of the second filter member 331" abuts against the second sub-assembly 302 of the second position-limiting assembly, so that the position of the second filter member is limited between the second sub-assembly of the second position-limiting assembly and the second sub-assembly of the second position-limiting assembly. The molecular sieve 34' is arranged between the first sub-assembly 321' of the first position-limiting assembly and the second sub-assembly 321" of the first position-limiting assembly. One side of the molecular sieve 34' abuts against the first sub-assembly 321' of the first position-limiting assembly, and another side of the molecular sieve 34' abuts against the second sub-assembly 321" of the first position-limiting assembly, so that the position of the molecular sieve is limited between the first sub-assembly of the first position-limiting assembly and the second sub-assembly of the first position-limiting assembly. In this embodiment, the first sub-assembly 301 of the second position-limiting assembly includes a first recess 3011, and the second sub-assembly 302 of the second position-limiting assembly includes a second recess 3021. The first recess 3011 is recessed from an outer peripheral wall of the first sub-assembly 301 of the second position-limiting assembly toward the flow guiding pipe 4, and the second recess 3021 is recessed from an outer peripheral wall of the second sub-assembly 302 of the second position-limiting assembly toward the flow guiding pipe 4. The liquid reservoir 104 includes a second seal 72, and a third seal 73. The second seal 72 is partially located in the first recess 3011, the third seal 73 is partially located in the second recess 3021, and the second seal 72 and the third seal 73 are in close contact with the inner peripheral wall of the housing 2'. The housing 2' includes a first position-limiting protrusion 24 and a second position-limiting protrusion 25 which both protrude from the inner side all of the housing 2' toward the flow guiding pipe 4. The first sub-assembly 301 of the second position-limiting assembly is limited by and in cooperation with the first position-limiting protrusion 24, and the second sub-assembly 302 of the second position-limiting assembly is limited by and in cooperation with the second position-limiting protrusion 25.

Figure 18:
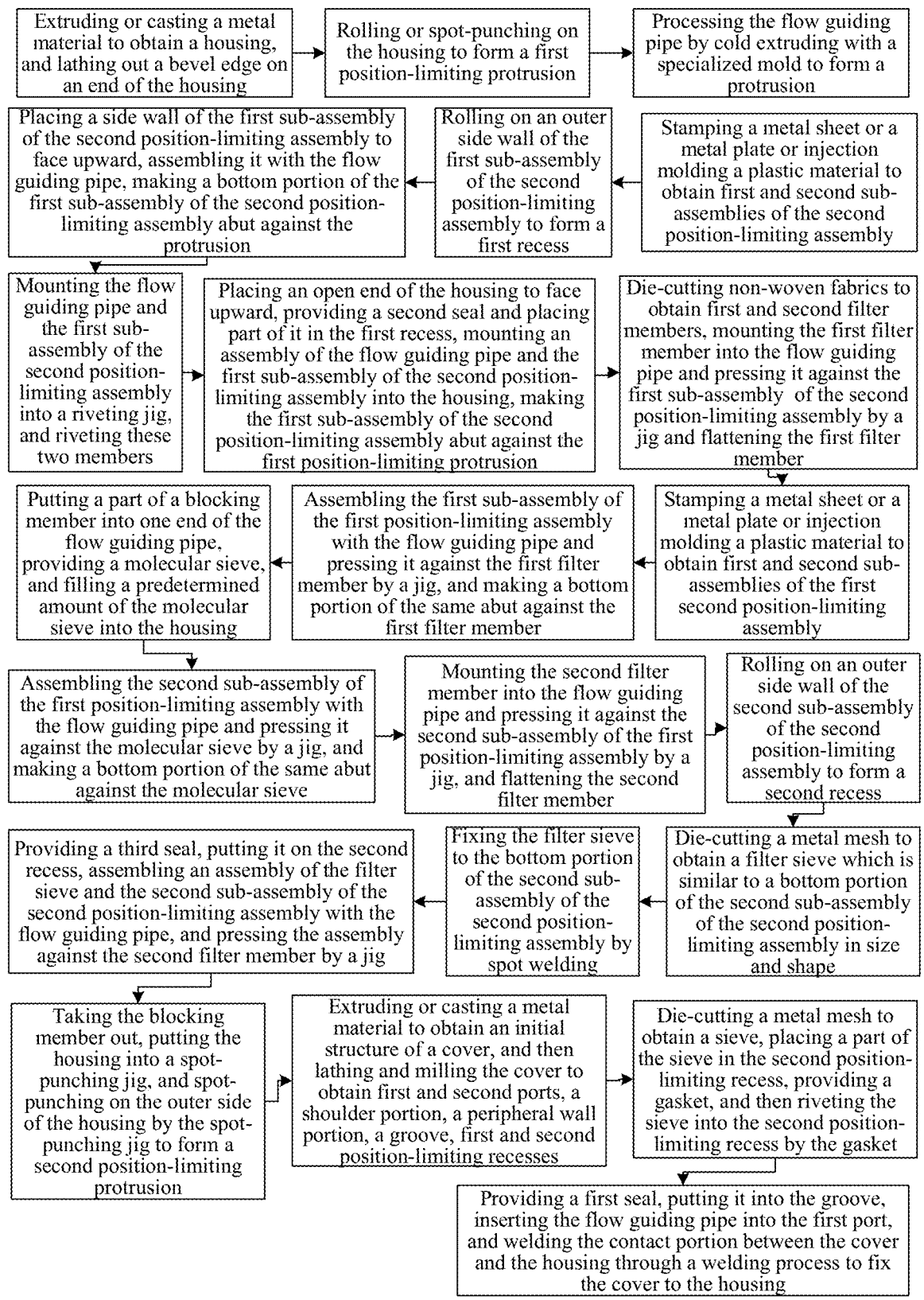
FIG. 18 is a schematic flowchart of a method for manufacturing the liquid reservoir according to the fifth embodiment.

Referring to FIGS. 17 to 18, a method for manufacturing the liquid reservoir in this embodiment mainly includes the following steps:

A first sub-assembly 3012 of a second position-limiting assembly is formed by stamping a metal sheet, or stamping a metal plate, or injection molding a plastic material, and a first recess 3011 is formed on the outer side wall of the first sub-assembly 3012 of the second position-limiting assembly by rolling. The first sub-assembly 3012 of the second position-limiting assembly and the flow guiding pipe 4 are assembled together and then fixed by riveting, or the first sub-assembly 3012 of the second position-limiting assembly is connected to the flow guiding pipe 4 by injection molding.

An open end of the housing 2' is placed to face upward, a second seal 72 is provided and placed in the first recess 3011, an assembly of the first sub-assembly 3012 of the second position-limiting assembly, the second seal 72 and the flow guiding pipe 4 is placed into the housing 2', and the first position-limiting protrusion 24 abuts against the first sub-assembly 3012 of the second position-limiting assembly.

A first filter member 331' is formed by die-cutting non-woven fabrics, and the first filter member 331' is assembled with the flow guiding pipe 4.

A first sub-assembly 3211' of the first position-limiting assembly is formed by stamping a metal sheet, or stamping a metal plate, or injection molding a plastic material, the first sub-assembly 3211' of the first position-limiting assembly is assembled with the flow guiding pipe 4, and the first sub-assembly 3012 of the second position-limiting assembly, the first filter member 331', the first sub-assembly 3211' of the first position-limiting assembly are together placed in the housing 2'.

A blocking member is partially mounted into one end of the flow guiding pipe 4, and a predetermined amount of the molecular sieve 34' is placed into the cavity of the housing 2'.

A second sub-assembly 3211" of the first position-limiting assembly is formed by stamping a metal sheet, or stamping a metal plate, or injection molding a plastic material, and the second sub-assembly 3211" of the first position-limiting assembly is assembled with the flow guiding pipe 4.

A second filter member 331" is formed by die-cutting non-woven fabrics, and the second filter member 331" is assembled with the flow guiding pipe 4.

A second sub-assembly 3022 of the second position-limiting assembly is formed by stamping a metal sheet, or stamping a metal plate, or injection molding a plastic material, a second recess 3021 is formed on the outer side wall of the second sub-assembly 3022 of the second position-limiting assembly by rolling, and the metal filter sieve 35 is fixed to the second sub-assembly 3022 of the second position-limiting assembly by spot welding. A third seal 73 is provided and placed in the second recess 3021, an assembly of the second sub-assembly 3022 of the second position-limiting assembly, the third seal 73 and the filter sieve 35 is assembled with the flow guiding pipe 4 and then placed in the housing 2', and then the blocking member is taken out.

Apparently, the processing of the first sub-assembly 3012 of the second position-limiting assembly, the first sub-assembly 3211' of the first position-limiting assembly, the second sub-assembly 3211" of the first position-limiting assembly, the second sub-assembly 3022 of the second position-limiting assembly, the first filter member 331' and the second filter member 331" may be performed at the same time.

A second position-limiting protrusion 25 is formed on the side wall of the housing 2' by spot-punching, and the second position-limiting protrusion 25 abuts against the second sub-assembly 3022 of the second position-limiting assembly, to fix the second sub-assembly 3022 of the second position-limiting assembly.

The processing methods of the cover 1, the sieve 5, and the gasket 6 are similar to those of the first embodiment, which will not be described herein again.

For the liquid reservoir manufactured according to the above method, the internal structure of the filter assembly is more stable, which relatively improves the filtering effect of the liquid reservoir.

Based on the above description of the disclosed embodiments, those skilled in the art are capable of carrying out or using the present application. Many changes to these embodiments are apparent for those skilled in the art, and general principles defined herein may be implemented in other embodiments without departing from the spirit or scope of the present application. Hence, the present application is not limited to the embodiments disclosed herein, but is to conform to the widest scope in accordance with the principles and novel features disclosed herein.

What is claimed is:

1. A liquid reservoir, comprising a cover and a housing, wherein the cover is hermetically fixed to the housing, the liquid reservoir further comprises a flow guiding pipe, and one end of the flow guiding pipe is connected with the housing;

the liquid reservoir further comprises a filter assembly which is arranged in the housing, the filter assembly comprises a first position-limiting assembly, a second position-limiting assembly, a filter member, and a molecular sieve;

the first position-limiting assembly comprises at least a first position-limiting member, the first position-limiting member comprises a bottom portion, a first protrusion, and a second protrusion, and the first protrusion protrudes from an inner peripheral edge of the bottom portion toward a side away from the filter member, a part of an outer side wall of the flow guiding pipe is limited by and in cooperation with an inner side wall of the first protrusion, the inner side wall of the first protrusion is arranged on an outer peripheral side of the part of the outer side wall of the flow guiding pipe, and the second protrusion protrudes from an outer peripheral edge of the bottom portion toward a side away from the filter member, and an outer side wall of the second protrusion is arranged on an inner peripheral side of a part of an inner side wall of the housing; and the filter member is placed between the first position-limiting assembly and the second position-limiting assembly, one side of the filter member abuts against the first position-limiting assembly, and another side of the filter member abuts against the second position-limiting assembly, wherein the housing comprises at least one position-limiting protrusion, the at least one position-limiting protrusion protrudes from an inner side wall of the housing, the second position-limiting member comprises a third protrusion, a fourth protrusion, a first position-limiting hole, and a first bottom portion;

the third protrusion and the fourth protrusion face toward a side away from the filter member, the filter member abuts against an outer bottom wall of the second position-limiting assembly, the third protrusion protrudes from an inner peripheral edge of the first bottom portion toward a side away from the filter member, and the fourth protrusion protrudes from an outer peripheral edge of the first bottom portion toward the side away from the filter member; and the first position-limiting hole penetrates through the first bottom portion, an inner side wall of the first position-limiting hole is an inner side wall of the third protrusion, a part of the outer side wall of the flow guiding pipe is limited by and in cooperation with the inner side wall of the third protrusion, the inner side wall of the third protrusion is arranged on the outer peripheral side of the part of the outer side wall of the flow guiding pipe, an outer side wall of the fourth protrusion is arranged on an inner peripheral side of a part of the inner sidewall of the housing, the fourth protrusion is limited by and in cooperation with the position-limiting protrusion, and a position of the first position-limiting member is limited by the housing.

2. The liquid reservoir according to claim 1, wherein a radial distance between a part of the outer side wall of the flow guiding pipe and the inner side wall of the first protrusion is 0 to 0.25 mm, and a radial distance between the outer side wall of the second protrusion and a part of the inner side wall of the housing is 0 to 0.28 mm;

the liquid reservoir comprises a first cavity, a second cavity, and a third cavity, and the first cavity at least comprises a region on one side of the first position-limiting assembly, the second cavity at least comprises a region on one side of the second position-limiting assembly, and the third cavity at least comprises a region between the first position-limiting assembly and the second position-limiting assembly; and the first position-limiting member further comprises a through hole, the through hole penetrates through the bottom portion, the second position-limiting assembly comprises at least a second position-limiting member, a bottom portion of the second position-limiting member comprises a communication hole, the first cavity is in communication with the third cavity through the through hole, the second cavity is in communication with the third cavity through the communication hole, and the molecular sieve is arranged in the first cavity or the second cavity.

3. The liquid reservoir according to claim 2, wherein the liquid reservoir further comprises a sieve, the sieve is fixed to the cover and arranged in the housing, the cover has a first port and a second port, one of the first port and the second port serves as a refrigerant inlet, the other of the first port and the second port serves as a refrigerant outlet, the sieve comprises a plurality of meshes, and the plurality of meshes are in communication with the second port.

4. The liquid reservoir according to claim 1, wherein the first position-limiting assembly and/or the second position-limiting assembly comprise at least one recess, and the at least one recess is recessed from an outer peripheral wall of the first position-limiting assembly and/or the second position-limiting assembly toward the flow guiding pipe; and the liquid reservoir comprises at least one seal, the at least one seal is partially arranged in the recess, the at least one seal is in close contact with an inner peripheral wall of the housing, and a compression ratio of the at least one seal is 15% to 30%.

5. The liquid reservoir according to claim 4, wherein the liquid reservoir further comprises a sieve, the sieve is fixed to the cover and arranged in the housing, the cover has a first port and a second port, one of the first port and the second port serves as a refrigerant inlet, the other of the first port and the second port serves as a refrigerant outlet, the sieve comprises a plurality of meshes, and the plurality of meshes are in communication with the second port.

6. The liquid reservoir according to claim 1, wherein the filter assembly comprises a third filter assembly and a filter pad, one side of the filter pad abuts against the third position-limiting assembly, the molecular sieve is arranged between the filter pad and the first position-limiting assembly, one side of the molecular sieve abuts against the filter pad, and another side of the molecular sieve abuts against the first position-limiting assembly; and the limiting protrusion comprises a first position-limiting protrusion and a second position-limiting protrusion, the third position-limiting assembly is limited by and in cooperation with the first position-limiting protrusion, and the second position-limiting assembly is limited by and in cooperation with the second position-limiting protrusion.

7. The liquid reservoir according to claim 6, wherein the third position-limiting assembly comprises a third position-limiting member, the third position-limiting member comprises a fifth protrusion, a sixth protrusion, a second position-limiting hole, and a second bottom portion;

the filter pad abuts against an outer bottom wall of the third position-limiting assembly, the fifth protrusion protrudes from an inner peripheral edge of the second bottom portion toward a side away from the filter pad, and the sixth protrusion protrudes from an outer peripheral edge of the second bottom portion toward the side away from the filter pad;

the second position-limiting hole penetrates through the second bottom portion, an inner side wall of the second position-limiting hole is an inner side wall of the fifth protrusion, a part of the outer side wall of the flow guiding pipe is limited by and in cooperation with the inner side wall of the fifth protrusion, the inner side wall of the fifth protrusion is arranged on the outer peripheral side of the part of the outer side wall of the flow guiding pipe, an outer side wall of the sixth protrusion is arranged on an inner peripheral side of a part of the inner sidewall of the housing, the sixth protrusion is limited by and in cooperation with the position-limiting protrusion, the third position-limiting member further comprises a communication hole, and the communication hole penetrates through the second bottom portion.

8. The liquid reservoir according to claim 1, wherein the first position-limiting assembly comprises a first sub-assembly of the first position-limiting assembly and a second sub-assembly of the first position-limiting assembly, and the second position-limiting assembly comprises a first sub-assembly of the second position-limiting assembly and a second sub-assembly of the second position-limiting assembly;

the filter member comprises a first filter member and a second filter member, the first filter member is arranged between the first sub-assembly of the first position-limiting assembly and the first sub-assembly of the second position-limiting assembly, one side of the first filter member abuts against the first sub-assembly of the first position-limiting assembly, and another side of the first filter member abuts against the first sub-assembly of the second position-limiting assembly;

the second filter member is arranged between the second sub-assembly of the first position-limiting assembly and the second sub-assembly of the second position-limiting assembly, one side of the second filter member abuts against the second sub-assembly of the first position-limiting assembly, and another side of the second filter member abuts against the second sub-assembly of the second position-limiting assembly; and the molecular sieve is arranged between the first sub-assembly of the first position-limiting assembly and the second sub-assembly of the first position-limiting assembly, one side of the molecular sieve abuts against the first sub-assembly of the first position-limiting assembly, and another side of the molecular sieve abuts against the second sub-assembly of the first position-limiting assembly.

9. The liquid reservoir according to claim 8, wherein the first position-limiting assembly comprises at least one filter sieve, and the at least one filter sieve is fixed to the bottom portion; and/or
the second position-limiting assembly comprises at least one filter sieve, and the at least one filter sieve is fixed to the first bottom portion; and/or
the third position-limiting assembly comprises at least one filter sieve, and the at least one filter sieve is fixed to the second bottom portion.

10. The liquid reservoir according to claim 9, wherein the liquid reservoir further comprises a sieve, the sieve is fixed to the cover and arranged in the housing, the cover has a first port and a second port, one of the first port and the second port serves as a refrigerant inlet, the other of the first port and the second port serves as a refrigerant outlet, the sieve comprises a plurality of meshes, and the plurality of meshes are in communication with the second port.

11. The liquid reservoir according to claim 10, wherein the sieve comprises a filter portion and a flange portion, the flange portion protrudes outward from the filter portion, an end of the cover facing a bottom portion of the housing is defined as a first end portion, and the first end portion of the cover is provided with a second position-limiting recess; and
the second position-limiting recess is recessed from the first end portion of the cover, the second position-limiting recess is in communication with the second port, the flange portion abuts against an inner side wall of the second position-limiting recess and abuts against a bottom wall of the second position-limiting recess; and
the liquid reservoir further comprises a gasket, an outer peripheral side wall of the gasket is in interference fit with the inner side wall of the second position-limiting recess, a bottom wall of the gasket abuts against the flange portion, the flange portion is arranged between the bottom wall of the second position-limiting recess and the bottom wall of the gasket, and at least part of the gasket is arranged in the second position-limiting recess.

12. A method for manufacturing a liquid reservoir according to claim 1, comprising:
providing a housing, and rolling an outer wall of the housing to obtain a position-limiting protrusion; providing a second position-limiting member and a flow guiding pipe, and assembling the flow guiding pipe with the second position-limiting member, to allow the second position-limiting member to be limited by and in cooperation with the position-limiting protrusion;
providing a filter member, and making one side of the filter member directly or indirectly abut against the second position-limiting member;
providing a first position-limiting member, assembling the flow guiding pipe with the first position-limiting member, and making another side of the filter member directly or indirectly abut against the first position-limiting member; and
providing a cover, and fixing the cover to the housing by welding.

13. The method for manufacturing the liquid reservoir according to claim 12, comprising:
stamping the first position-limiting member to form a position-limiting hole, a bottom portion, a first protrusion, a second protrusion and a through hole, wherein the second protrusion is limited by and in cooperation with the limiting protrusion;
stamping the second position-limiting member to form a first position-limiting hole, a first bottom portion, a third protrusion, a fourth protrusion, and a communication hole;
rolling a side wall of the first position-limiting member to form a recess; and/or rolling a side wall of the second position-limiting member to form a recess; and
providing a seal, and mounting part of the seal into the recess.

14. The method for manufacturing the liquid reservoir according to claim 13, comprising:
providing a third position-limiting member and a filter pad, and machining the third position-limiting member to form a fifth protrusion, a sixth protrusion, a second position-limiting hole, a second bottom portion, and a communication hole;
rolling a side wall of the third position-limiting member to form a recess, and making one side of the third position-limiting member abut against the filter pad; and
providing a molecular sieve, and making one side of the filter member directly or indirectly abut against the first position-limiting member and another side of the molecular sieve abut against the filter pad.

15. The method for manufacturing the liquid reservoir according to claim 14, comprising:
forming the housing by extruding or casting a metal material;
forming the first position-limiting member by stamping a metal sheet or a metal plate;
forming the second position-limiting member by stamping a metal sheet or a metal plate; and
forming the filter sieve, wherein the filter sieve is formed by die-cutting a metal mesh, and the filter sieve is fixed to the first position-limiting member by welding to form the first position-limiting assembly; and/or forming another filter sieve, wherein the filter sieve is formed by die-cutting a metal mesh, and the filter sieve is fixed to the second position-limiting member by welding to form the second position-limiting assembly; and/or forming yet another filter sieve, wherein the filter sieve is formed by die-cutting a metal mesh, and the filter sieve is fixed to the third position-limiting member by welding to form the third position-limiting assembly.

16. The method for manufacturing the liquid reservoir according to claim 12, comprising:
providing a first sub-assembly of the first position-limiting member, a second sub-assembly of the first position-limiting member, a first filter member, a second filter member, a first sub-assembly of the second position-limiting assembly, and a second sub-assembly of the second position-limiting assembly, wherein the second position-limiting member comprises the first sub-assembly of the second position-limiting member and the second sub-assembly of the second position-limiting member, the first position-limiting member comprises the first sub-assembly of the first position-limiting member and the second sub-assembly of the first position-limiting member, and the filter member comprises the first filter member and the second filter member;
making one side of the first filter member directly or indirectly abut against the first sub-assembly of the first position-limiting member, and making another side of the first filter member directly or indirectly abut against the first sub-assembly of the second position-limiting member;

making one side of the second filter member directly or indirectly abut against the second sub-assembly of the first position-limiting member, and making another side of the second filter member directly or indirectly abut against the second sub-assembly of the second position-limiting member; and providing a molecular sieve, making one side of the molecular sieve directly or indirectly abut against the first sub-assembly of the first position-limiting member, and making another side of the molecular sieve directly or indirectly abut against the second sub-assembly of the first position-limiting member.

17. The method for manufacturing the liquid reservoir according to claim 16, comprising:

forming the housing by extruding or casting a metal material;

forming the first position-limiting member by stamping a metal sheet or a metal plate;

forming the second position-limiting member by stamping a metal sheet or a metal plate; and forming the filter sieve, wherein the filter sieve is formed by die-cutting a metal mesh, and the filter sieve is fixed to the first position-limiting member by welding to form the first position-limiting assembly; and/or forming another filter sieve, wherein the filter sieve is formed by die-cutting a metal mesh, and the filter sieve is fixed to the second position-limiting member by welding to form the second position-limiting assembly; and/or forming yet another filter sieve, wherein the filter sieve is formed by die-cutting a metal mesh, and the filter sieve is fixed to the third position-limiting member by welding to form the third position-limiting assembly.

18. The liquid reservoir according to claim 1, wherein the liquid reservoir further comprises a sieve, the sieve is fixed to the cover and arranged in the housing, the cover has a first port and a second port, one of the first port and the second port serves as a refrigerant inlet, the other of the first port and the second port serves as a refrigerant outlet, the sieve comprises a plurality of meshes, and the plurality of meshes are in communication with the second port.

* * * * *